(12) United States Patent
Russo et al.

(10) Patent No.: US 12,061,260 B2
(45) Date of Patent: Aug. 13, 2024

(54) MULTI-STATIC COHERENT LiDAR

(71) Applicant: Analog Photonics LLC, Boston, MA (US)

(72) Inventors: Peter Nicholas Russo, Somerville, MA (US); Christopher Vincent Poulton, Cambridge, MA (US); Matthew Byrd, Arlington, MA (US); Zhan Su, Boston, MA (US); Ehsan Hosseini, Boston, MA (US); Michael Robert Watts, Hingham, MA (US)

(73) Assignee: Analog Photonics LLC, Boston, MA (US)

( * ) Notice: Subject to any disclaimer, the term of this patent is extended or adjusted under 35 U.S.C. 154(b) by 22 days.

(21) Appl. No.: 17/975,834

(22) Filed: Oct. 28, 2022

(65) Prior Publication Data

US 2023/0052542 A1    Feb. 16, 2023

Related U.S. Application Data

(63) Continuation of application No. 16/825,556, filed on Mar. 20, 2020, now Pat. No. 11,525,915, which is a
(Continued)

(51) Int. Cl.
   *G01S 17/32* (2020.01)
   *G01S 7/481* (2006.01)
   (Continued)

(52) U.S. Cl.
   CPC ............ *G01S 17/32* (2013.01); *G01S 7/4815* (2013.01); *G01S 7/4816* (2013.01); *G01S 7/4911* (2013.01); *G01S 7/4918* (2013.01)

(58) Field of Classification Search
   CPC ..................... G01S 17/42; G01S 17/32; G01S 7/4815–4816; G01S 7/4911; G01S 7/4918
   (Continued)

(56) References Cited

U.S. PATENT DOCUMENTS

| | | |
|---|---|---|
| 4,950,880 A | 8/1990 | Hayner |
| 5,606,736 A | 2/1997 | Hasler et al. |

(Continued)

OTHER PUBLICATIONS

Idell et al., "Image synthesis from nonimaged laser-speckle patterns", Optics Letters, vol. 12, No. 11, pp. 858-860, Nov. 1987.
(Continued)

*Primary Examiner* — Bo Fan
(74) *Attorney, Agent, or Firm* — Young Basile Hanlon & MacFarlane, P.C.

(57) ABSTRACT

At least one beam of an optical wave is transmitted along a transmission angle toward a target location from a send aperture of a transmitter. The optical wave comprises at least a first portion, and a second portion having a different characteristic from a characteristic of the first portion. Two or more receivers include at least one receiver comprising: a receive aperture arranged in proximity to at least one of the send aperture or a receive aperture of a different receiver, an optical phased array within the receive aperture, the optical phased array being configured to receive at least a portion of a collected optical wave arriving at the receive aperture along a respective collection angle, and a filter configured to filter the received portion of the collected optical wave according to the characteristic of the first portion of the optical wave.

38 Claims, 34 Drawing Sheets

Related U.S. Application Data continuation-in-part of application No. 16/402,964, filed on May 3, 2019, now Pat. No. 11,513,224.

(60) Provisional application No. 62/926,085, filed on Oct. 25, 2019, provisional application No. 62/821,427, filed on Mar. 20, 2019, provisional application No. 62/666,110, filed on May 3, 2018.

(51) Int. Cl.
  *G01S 7/4911* (2020.01)
  *G01S 7/4912* (2020.01)

(58) Field of Classification Search
  USPC .............................. 356/4.01; 342/4, 51, 374
  See application file for complete search history.

(56) References Cited

U.S. PATENT DOCUMENTS

| | | |
|---|---|---|
| 6,485,150 B1 | 11/2002 | Driggers et al. |
| 7,397,568 B2 | 7/2008 | Bryce et al. |
| 7,786,928 B2 | 8/2010 | Hansen et al. |
| 8,605,761 B2 | 12/2013 | Hutchin |
| 9,316,534 B1 | 4/2016 | Kondratko et al. |
| 9,740,079 B1 | 8/2017 | Davids et al. |
| 2002/0196179 A1 | 12/2002 | Mattox |
| 2003/0038746 A1 | 2/2003 | Patel et al. |
| 2003/0132871 A1 | 7/2003 | Laflaquiere et al. |
| 2004/0246604 A1 | 12/2004 | Fiete et al. |
| 2006/0072117 A1 | 4/2006 | Ruth et al. |
| 2014/0044214 A1 | 2/2014 | Gossmann et al. |
| 2014/0376001 A1 | 12/2014 | Swanson |
| 2015/0104193 A1 | 4/2015 | Pierrottet et al. |
| 2017/0184450 A1 | 6/2017 | Doylend et al. |
| 2017/0350965 A1 | 12/2017 | Schmalenberg |
| 2017/0371227 A1 | 12/2017 | Skirlo et al. |
| 2018/0052378 A1 | 2/2018 | Shin et al. |
| 2018/0232208 A1 | 8/2018 | Chong et al. |
| 2018/0284274 A1 | 10/2018 | LaChapelle |
| 2018/0306925 A1 | 10/2018 | Hosseini et al. |
| 2018/0321569 A1 | 11/2018 | Spector et al. |
| 2018/0348592 A1* | 12/2018 | Hosseini ................. G01S 17/42 |
| 2019/0004151 A1 | 1/2019 | Abediasl et al. |
| 2019/0339389 A1 | 11/2019 | Russo et al. |
| 2020/0217961 A1 | 7/2020 | Russo et al. |
| 2020/0319524 A1 | 10/2020 | Hosseini et al. |

OTHER PUBLICATIONS

Idell et al., "Image synthesis from nonimaged laser-speckle patterns: experimental verification", Optics Letters, vol. 14, No. 3, pp. 154-156, Feb. 1, 1989.

* cited by examiner

MULTI-STATIC COHERENT LiDAR

CROSS-REFERENCE TO RELATED APPLICATION(S)

This application is a continuation of U.S. application Ser. No. 16/825,556, entitled "Multi-Static Coherent LiDAR," filed Mar. 20, 2020, which is a continuation-in-part of U.S. application Ser. No. 16/402,964, entitled "Multi-Static Coherent LiDAR," filed May 3, 2019, which claimed the benefit of U.S. Provisional Application Ser. No. 62/666,110, entitled "Multi-Static Coherent LiDAR," filed May 3, 2018, and which also claimed the benefit of U.S. Provisional Application Ser. No. 62/821,427, entitled "Multi-Static Coherent LiDAR," filed Mar. 20, 2019, and U.S. Provisional Application Ser. No. 62/926,085, entitled "Multi-Static Coherent LiDAR," filed Oct. 25, 2019. The entire disclosures of each of the applications listed above are hereby incorporated by reference.

STATEMENT AS TO FEDERALLY SPONSORED RESEARCH

This invention was made with government support under the following contract: DARPA Contract No. HR0011-16-C-0108. The government has certain rights in the invention.

TECHNICAL FIELD

This disclosure relates to multi-static coherent LiDAR.

BACKGROUND

Some LiDAR systems use a single aperture to transmit and receive light (referred to herein as a "monostatic" aperture configuration). Alternatively, some LiDAR systems use two apertures in close proximity—one for transmitting and one for receiving (referred to herein as a "bistatic" aperture configuration). Different systems optimize various aspects of the LiDAR configuration based on different criteria. An optical wave is transmitted from an optical source to target object(s) at a given distance and the photons backscattered from the target object(s) are collected. The optical source used in a continuous wave (CW) LiDAR system is typically a laser, which provides an optical wave that has as narrow linewidth and has a peak wavelength that falls in a particular range (e.g., between about 100 nm to about 1 mm, or some subrange thereof), also referred to herein as simply "light." Some LiDAR systems may be designed to use either a monostatic or bistatic aperture configuration, depending on a variety of tradeoffs that may be made in system performance and/or system design.

SUMMARY

In one aspect, in general, an apparatus includes: at least one transmitter comprising a send aperture configured to provide at least one beam of a transmitted optical wave along a transmission angle toward a target location, the optical wave comprising at least a first portion of the optical wave, and a second portion of the optical wave having a different characteristic from a characteristic of the first portion of the optical wave; and two or more receivers, at least one receiver comprising: a receive aperture arranged in proximity to at least one of the send aperture or a receive aperture of a different receiver, an optical phased array within the receive aperture, the optical phased array being configured to receive at least a portion of a collected optical wave arriving at the receive aperture along a respective collection angle, a filter configured to filter the received portion of the collected optical wave according to the characteristic of the first portion of the optical wave, and a detector configured to provide a signal based on the received portion of the collected optical wave.

In another aspect, in general, a method includes: providing at least one beam of a transmitted optical wave along a transmission angle toward a target location from a send aperture of a transmitter, the optical wave comprising at least a first portion of the optical wave, and a second portion of the optical wave having a different characteristic from a characteristic of the first portion of the optical wave; and receiving a collected optical wave at receive apertures of two or more receivers, at least one receiver comprising: a receive aperture arranged in proximity to at least one of the send aperture or a receive aperture of a different receiver, an optical phased array within the receive aperture, the optical phased array being configured to receive at least a portion of a collected optical wave arriving at the receive aperture along a respective collection angle, a filter configured to filter the received portion of the collected optical wave according to the characteristic of the first portion of the optical wave, and a detector configured to provide a signal based on the received portion of the collected optical wave.

Aspects can include one or more of the following features.

Each detector comprises a coherent detector configured to optically combine the received portion of the collected optical wave with a local oscillator optical wave to provide a combined optical wave and to detect the combined optical wave to provide the signal.

There is a frequency shift between the local oscillator and the transmitted optical wave to enable heterodyne detection in coherent detectors.

Each signal comprises an amplitude and a phase angle, and the respective component corresponding to that signal comprises a quantity that is based on the amplitude and is independent from the phase angle.

The circuitry is configured to convert each signal to digital form and to process the signals in digital form to remove dependence on the phase angles.

At least one coherent detector is configured to use a first local oscillator optical wave to provide an in-phase combined optical wave and to use a second local oscillator optical wave shifted relative to the first local oscillator wave to provide a quadrature combined optical wave, and to provide the amplitude and phase angle in an In-phase/Quadrature (I/Q) space.

The circuitry is configured to perform a transform on a real-valued signal provided from one of the detectors to provide the amplitude and phase angle in a complex space of a resulting complex transform of the real-valued signal.

Each detector is configured to generate a current that represents a difference between photocurrents generated by a pair of balanced photodetectors.

A total quantity of the receive apertures is between 3 and 20.

A total quantity of the receive apertures is between 4 and 10.

A total quantity of send apertures is 1.

An area of each receive apertures is equal to an area of the send aperture within a factor of between 4/5 to 5/4.

The receive apertures are arranged along an axis in a plane in which the optical phased arrays are configured to provide steering of the respective collection angles using phases of elements of the optical phased arrays.

Each of the optical phased arrays of the receivers is configured to align the respective collection angle with the target location.

The transmitter comprises an optical phased array within the send aperture.

An area of each optical phased array within the receive apertures is equal to an area of the optical phased array with the send aperture within a factor between 4/5 to 9/4.

At least one optical phased array within the send aperture or at least one of the receive apertures is configured to steer a first angle using phases of elements of the optical phased array and to steer a second angle using wavelength.

The receiver is a first receiver, the receive aperture is a first receive aperture, the optical phased array is a first optical phased array, the filter is a first filter, the detector is a first detector, and the two or more receivers include a second receiver comprising: the send aperture configured as a second receive aperture, a second optical phased array within the send aperture, the second optical phased array being configured to receive at least a portion of a collected optical wave arriving at the send aperture along a respective collection angle, a second filter configured to filter the received portion of the collected optical wave according to a characteristic different from the characteristic of the first portion of the optical wave and different from the characteristic of the second portion of the optical wave, and a second detector configured to provide a signal based on the filtered portion of the collected optical wave filtered by the second filter.

The apparatus further comprises circuitry configured to determine an estimated distance associated with the collected optical wave based at least in part on a combination that includes a respective component corresponding to each of two or more of the signals provided from the detectors of the two or more receivers.

The transmitter applies linear frequency modulation to the transmitted optical wave to enable the circuitry to determine the estimated distance.

The send aperture is further configured as a receive aperture in which an optical phased array is used to receive at least a portion of an optical wave having a different characteristic from a characteristic of the transmitted optical wave, and at least one of the receive apertures is used as a send aperture for providing a beam of an optical wave having the different characteristic.

The characteristics comprise at least one of: a particular wavelength, a particular time slot, or a particular polarization.

The characteristics comprise a particular wavelength.

One or more optical sources provide a plurality of spectral components tunable over different respective spectral bands, and the first portion of the optical wave comprises a first spectral component and the second portion of the optical wave comprises a second spectral component different from the first spectral component.

The apparatus further comprises the one or more optical sources.

The send aperture is further configured as a receive aperture in which an optical phased array is used to receive a third spectral component different from the first spectral component and different from the second spectral component.

The third spectral component has a wavelength between a wavelength of the first spectral component and a wavelength of the second spectral component, and the transmitted optical wave does not have significant power at the wavelength of the third spectral component.

The send aperture is a first send aperture and the transmitted optical wave is a first transmitted optical wave, and the apparatus comprises a second send aperture configured to provide at least one beam of a second transmitted optical wave comprising at least a third spectral component different from the first spectral component and different from the second spectral component.

The second send aperture is further configured as a second receive aperture in which an optical phased array is used to receive the first spectral component.

The apparatus further comprises a coherent receiver configured to detect the first spectral component received from the second receive aperture by coherent mixing with a local oscillator derived from at least one optical source that provides the first spectral component to the first send aperture.

The third spectral component has a wavelength between a wavelength of the first spectral component and a wavelength of the second spectral component, and the first transmitted optical wave does not have significant power at the wavelength of the third spectral component.

The first send aperture and the second send aperture are located in proximity to a center of an arrangement of apertures, and at least some of the receive apertures are located in proximity to edges of the arrangement of apertures.

A quantity of receive apertures is greater than a quantity of send apertures in the arrangement of apertures.

In another aspect, in general, a LiDAR system, comprises: an arrangement of two or more apertures configured to provide, from at least two of the two or more apertures, at least one beam of a transmitted optical wave toward a target location, the two or more apertures comprising: a first aperture that includes a first optical phased array within the first aperture, and a second aperture that includes a second optical phased array within the second aperture; a transmitter subsystem configured to: provide to a first subset consisting of fewer than all of the two or more apertures a first portion of the transmitted optical wave, the first subset including the first aperture, and provide to a second subset consisting of fewer than all of the two or more apertures a second portion of the transmitted optical wave, the second subset being different from the first subset and including the second aperture and, and the second portion of the optical wave having a different characteristic from a characteristic of the first portion of the optical wave; and a receiver subsystem comprising: a first filter configured to filter a portion of a collected optical wave arriving at at least one of the two or more apertures in the arrangement, according to the characteristic of the second portion of the optical wave, and a first detector configured to provide a signal based on the portion of the collected optical wave filtered by the first filter.

Aspects can include one or more of the following features.

The characteristics comprise a particular wavelength, and the first portion of the transmitted optical wave comprises light having a wavelength in a first spectral band and the second portion of the transmitted optical wave comprises light having a wavelength in a second spectral band different from the first spectral band.

The first filter is configured to filter a portion of the collected optical wave arriving at the first aperture, and the receiver subsystem further comprises: a second filter configured to filter a portion of the collected optical wave arriving at the second aperture, according to the characteristic of the first portion of the optical wave, and a second detector configured to provide a signal based on the portion of the collected optical wave filtered by the second filter.

The transmitter subsystem includes a wavelength division multiplexing component configured to combine the light having a wavelength in the first spectral band with light having a wavelength in a third spectral band, where the second spectral band is between the first spectral band and the third spectral band.

The arrangement of two or more apertures includes a third aperture that includes a third optical phased array within the third aperture, and the first filter is configured to filter a portion of the collected optical wave arriving at the third aperture.

The transmitter subsystem includes a first wavelength division multiplexing component configured to combine the light having a wavelength in a first spectral band with light having a wavelength in a third spectral band, and a second wavelength division multiplexing component configured to combine the light having a wavelength in the second spectral band with light having a wavelength in a fourth spectral band, wherein the second spectral band is between the first spectral band and the third spectral band, and the third spectral band is between the second spectral band and the fourth spectral band.

The first filter comprises a tunable filter having a passband that is tunable over the second spectral band, and the receiver subsystem is configured to tune the first filter based at least in part on the light having the wavelength in the second spectral band.

Aspects can have one or more of the following advantages.

Using the techniques described herein, a LiDAR system may be optimized in various ways. For example, in some implementations, for a given total device area (e.g., for both send and receive apertures together), and for a given optical source output power, an increased number of backscattered photons are collected from the target object(s) while the background leakage light is reduced. Some implementations enable improved tolerance to speckle effects resulting from the interference from the backscattered light from rough (e.g., non-mirror) surfaces, and improved performance for both long-range and short-range target distances to a target location at which target objects may be expected.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the case of a monostatic aperture configuration, there are several approaches for multiplexing the aperture for both transmit operation and receive operation. For example, some approaches include: (1) using a polarizer to transmit light in one polarization and receive light in the opposite (i.e., orthogonal) polarization, (2) time domain multiplexing, and/or (3) using non-reciprocal devices such as a circulator. While monostatic aperture configurations may use all of the available aperture space for both a send aperture that will transmit a light beam towards a target location and a receive aperture that will collect any backscattered light arriving at the same aperture, it may be difficult to achieve high enough isolation between the transmit and receive paths within the LiDAR system such that the receiver can detect small reflections from a target object without the receiver being saturated by leaked transmitted light. In a frequency modulated continuous wave (FMCW) LiDAR system, the backscattering inside the monostatic system leads to strong low frequency peaks that can reduce the signal-to-noise ratio (SNR) for actual target detection at higher frequencies. In a bistatic aperture configuration, light is transmitted from one aperture and received from a different aperture, overcoming the isolation challenges in a monostatic aperture configuration at the cost of reduced size for both the transmit and receive aperture within the available aperture space.

Figure 1:
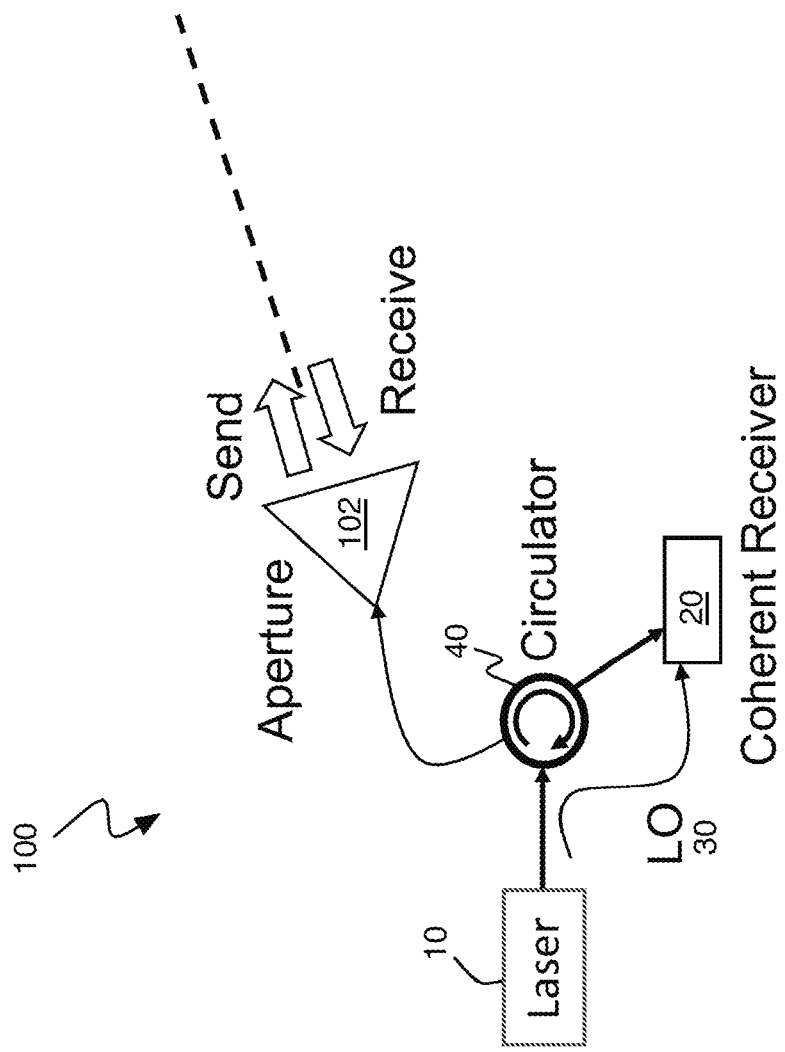
FIG. 1 is a schematic diagram of an example of a monostatic LiDAR system.
Figure 2:
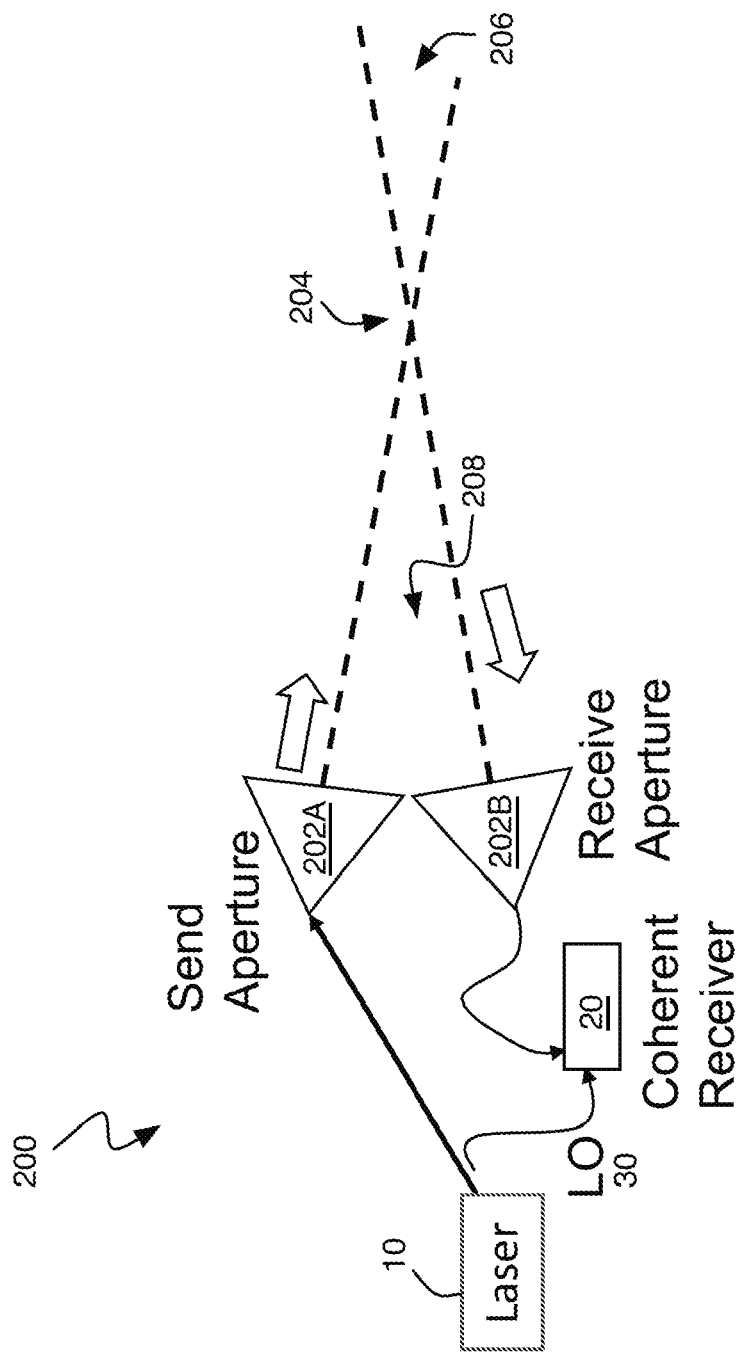
FIG. 2 is a schematic diagram of an example of a bistatic LiDAR system.

FIGS. 1 and 2 show examples of LiDAR systems using a monostatic aperture configuration 100 and a bistatic aperture configuration 200, respectively. Both systems include a laser 10, and a coherent receiver 20, used to mix received light with light of a local oscillator (LO) 30. The laser 10 may be a CW laser that has a narrow linewidth and low phase noise, for example, sufficient to provide a temporal coherence length that is long enough to perform coherent detection over the time scales of interest. The monostatic aperture configuration 100 also includes a circulator 40 for redirecting light in different directions. In the monostatic aperture configuration 100, an aperture 102 serves as both a send and receive aperture, so the transmission angle of the path from the aperture 102 to a target location and the collection angle of the path from the target location back to the aperture 102 are substantially the same (FIG. 1), regardless of the distance to the target location. While, in a bistatic aperture configuration 200, the path from a send aperture 202A to a target location 204 and the path from the target location 204 to a receive aperture 202B are different and result in different transmission and collection angles (FIG. 2). In some LiDAR systems, the transmission and collection angles are aligned for operation at an optimal target distance to the target location 204. As a result, operation at a further target distance 206 or a shorter target distance 208 may provide sub-optimal performance. Also, since the available area for the apertures is divided between send and receive for bistatic, the bistatic configuration has a lower space efficiency than a monostatic configuration.

Figure 3A:
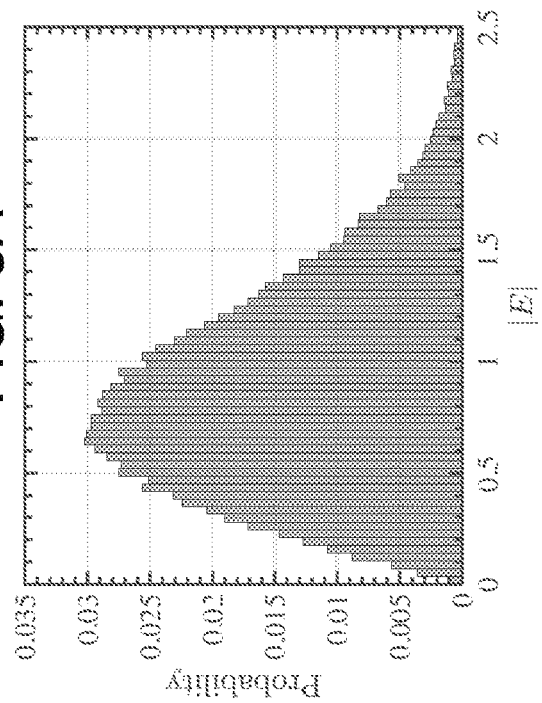
FIGS. 3A, 3B, and 3C are plots of example simulated detection results.
Figure 3B:
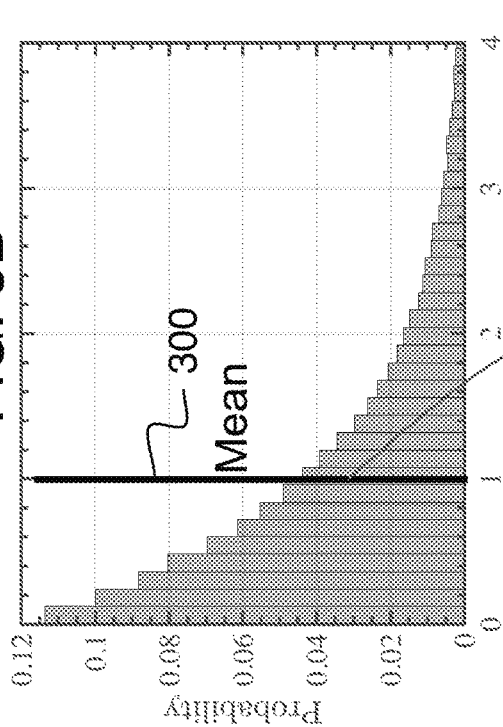
Figure 3C:
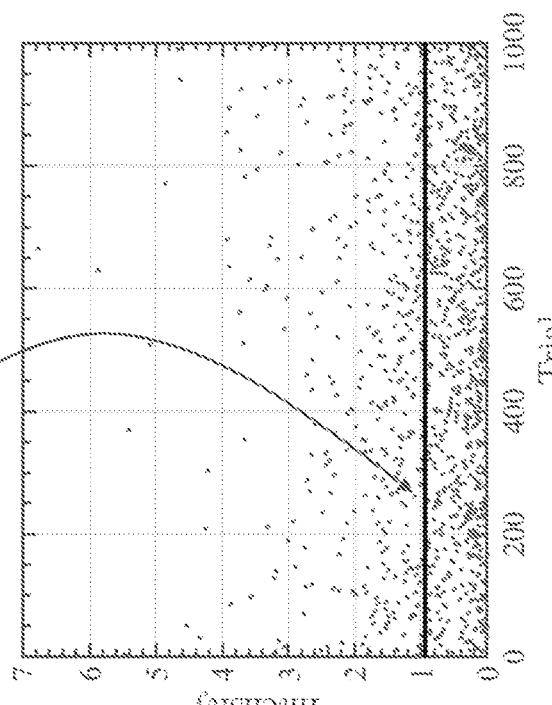

If the surface of a target object is not polished (e.g., like the surface of a metallic mirror) or is not otherwise configured as having a retro-reflective surface, the backscattered light experiences the random phase fluctuations that are imposed upon it by the surface roughness of the target object. The microscopic features on most rough surfaces lead to a randomized phase for the light backscattered from each point on the surface. This in turn leads to the speckle phenomenon, which is responsible for the interference patterns observed at the receive aperture. Due to the random walk nature of the interference pattern created by scattering from an extended surface with a with randomized phase, the amplitude of the collected light has a Rayleigh distribution and the intensity of the light collected (proportional to the number of photons entering the receive aperture) has an exponential statistical distribution. Therefore, for example, if a transmitted light beam is moved across a wall and on average 10 photons are collected back, for most target positions the aperture collects much less than 10 photons and every so often the receiver might collect tens of photons and saturate the circuitry of the receiver's detection system. When the LiDAR system is collecting too few photons the collected light might be buried under the background noise and when too many photons are collected the light might be outside of the linear gain range of the detection system. FIGS. 3A, 3B, and 3C show examples of simulated detection results for effects of speckle in a LiDAR system. FIG. 3A shows a plot of the Rayleigh probability density for a particular normalized value of electric field amplitude. FIG. 3B shows a corresponding plot of a probability density for electric field intensity, which is exponential. FIG. 3C shows a Monte-Carlo simulation of a 1000 randomized trials for a normalized intensity. A normalized mean intensity value of 1 is shown (300) in the plots of FIGS. 3B and 3C. As FIG. 3C shows, when the average intensity is normalized to 1, most of the trials correspond to a value of less than unity while a few distinct trials result in intensities much larger.

Both the monostatic and bistatic aperture configurations of a LiDAR system potentially suffer from potential detrimental effects due to speckle in the system's coherent receiver. When there is only one receive aperture, whose size is approximately matched to the size of the send aperture, there is only one portion of a particular interference pattern (also called a "speckle realization") that is detected at the receiver. This limits the probability of detection in the receiver because of the exponential probability distribution of the signal collected from a single speckle realization.

For a given LiDAR system, typically the total usable area available for any number of send and receive apertures is limited by the size of the system or the size of the reticle allowable in a certain fabrication process if the LiDAR system is manufactured in a planar integrated optics flow. In a LiDAR system with a multi-static aperture configuration, this usable area is used for one or more send apertures and two or more receive apertures in an aperture arrangement. The total area used for the one or more send apertures divided by the total area used for the two or more receive apertures is referred to as the "send-to-receive ratio." The total area used for the two or more receive apertures divided by the total area used for the entire aperture arrangement is referred to as the "receive fill factor." These and other parameters can be optimized in various ways by appropriate design of the number of apertures and their sizes.

Figure 4B:
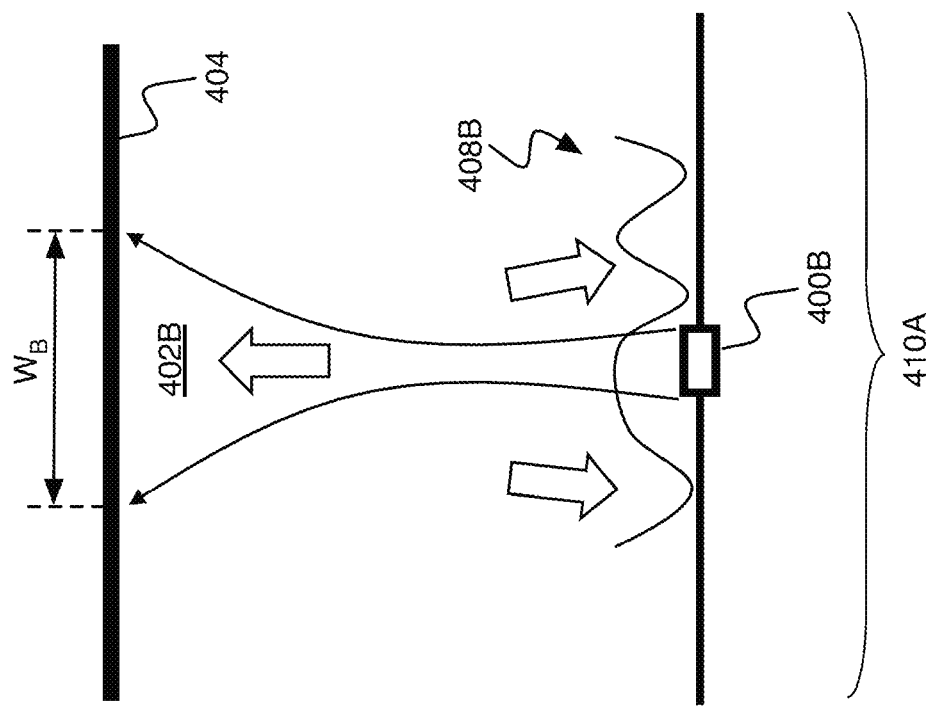
FIGS. 4A and 4B are schematic diagrams of examples of apertures and corresponding speckle patterns received from a target.
Figure 4A:
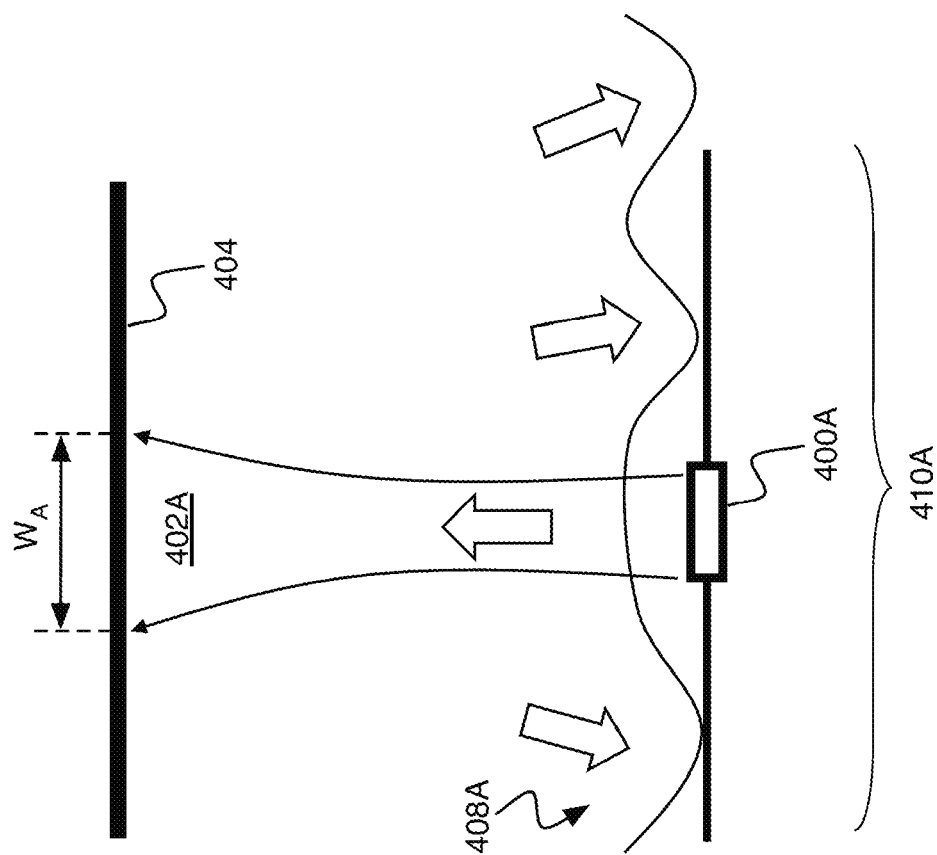

FIGS. 4A and 4B show examples of different send apertures having different sizes. For example, the send apertures can be a square shaped region that is substantially filled by the area of a two-dimensional optical phased array (OPA) transmitting a light beam that is steered by characteristics of the array, as described in more detail below. Assuming no aberrations in the system, for a particular send aperture 400A, 400B, the size $W_A$, $W_B$ of the diffraction limited transmitted light beam 402A, 402B in the far field is inversely proportional to the size of the send aperture 400A, 400B. This transmitted light beam 402A, 402B hits the surface 404 of a target object and illuminates a certain area on the surface of that target object. The backscattered light from the target object's illuminated area creates a speckle pattern 408A, 408B on the aperture arrangement 410A, 410B. The correlation length of the speckle pattern created on the aperture arrangement 410A, 410B is inversely proportional to the size of the illuminated area 406A, 406B. Therefore, the smaller send aperture 400B leads to a faster changing speckle pattern 408B (e.g., with smaller-sized speckle pattern bright/dark features created by constructive/destructive interference), and the larger send aperture 400A leads to a slower changing speckle pattern 408A (e.g., with larger-sized speckle pattern bright/dark features). The optimal quantity of and size of the two or more receive apertures within each of the aperture arrangements may be different depending on the size of the send aperture. For example, in some implementations, the size of each of the receive apertures is equal in size, or comparable in size (e.g., within a factor of ½ to 2 in diameter, and within a factor of ¼ to 4 in area; or, within a factor of ⅔ to 3/2 in diameter, and within a factor of 4/9 to 9/4 in area) to the size of the send aperture. In some implementations, the sizes of the receive apertures are approximately equal to each other, but the size of the send aperture may be larger than the sizes of the receive apertures by a small amount (e.g., by 10% larger or 20% larger).

In some implementations, the aperture arrangement comprises a collection of at least three apertures for use in a coherent LiDAR system, placed in close proximity. At least one of the apertures is used as a send aperture for transmitting light towards a target location, and at least two of the apertures are used as receive apertures for receiving backscattered light that originated from that send aperture. In a multi-wavelength LiDAR system, there may be different apertures selected as a single send aperture for a given center wavelength, and all of the remaining apertures are selected as receive apertures for that given center wavelength (potentially with a frequency chirp imposed around that center wavelength). In a LiDAR system that uses optical phased arrays, a receive aperture can use an optical phased array to steer a collection angle, and a send aperture can use an optical phased array to steer a transmission angle, as described in more detail below. These optical phased arrays can have an array size (number of individual optically dispersive phase-controlled elements), and resulting transverse beam size, that are matched (or nearly matched) to each other in size.

Figure 5C:
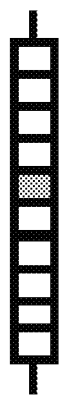
FIGS. 5A, 5B, and 5C are schematic diagram of example aperture arrays.
Figure 5B:
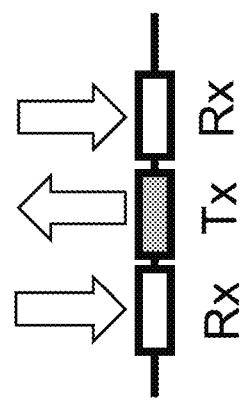
Figure 5A:
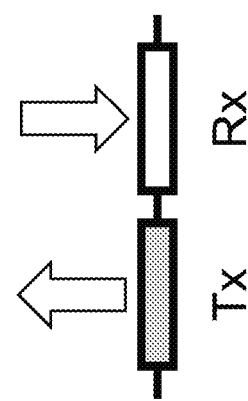

FIGS. 5A, 5B, and 5C show examples in which the apertures are arranged linearly along one dimension, where aperture size is shown as the width of identical square-shaped apertures (with the other dimension of aperture height being into the page in these examples). This type of linear aperture arrangement of N apertures may use one send aperture of size 1/N as a fraction of the total available space (e.g., along a long side of a rectangular area available for the aperture arrangement), and may fill the rest of the available aperture space with N−1 apertures also of size 1/N as a fraction of the available aperture space. The percentage of the total available aperture space that is used for receiving light approaches 100% as the number of receive apertures increases. As can be seen in FIGS. 5A, 5B, and 5C, in which N changes from 2 (FIG. 5A) to 3 (FIG. 5B) to 10 (FIG. 5C), as the number of receive apertures is increased (from 1 to 2 to 9), the relative size of the send aperture is decreased (from ½ to ⅓ to 1/10) and the fraction representing the receive fill factor increases (from ½ to ⅔ to 9/10). But, the send-to-receive ratio also decreases (from 1 to ½ to 1/9). A tradeoff may be made between receive fill factor and send-to-receive ratio such that an optimal number of apertures may be selected for any given system design. For example, in some system implementations, a value of N anywhere between 5 to 11 may provide an acceptable tradeoff. In other implementations, a wider range of N values may be tolerated (e.g., between 4 to 20), or there may be a value of N that maximizes certain performance parameters for given tolerances (e.g., N=9). With an odd value of N, the send aperture can be located in the center of the aperture arrangement, which may be desirable in some implementations (e.g., to reduce errors due to parallax effects for receive apertures furthest away from the send aperture). Similar properties would also hold for a two-dimensional arrangement of apertures within an available aperture space of square shape, where the send aperture may still be near the center in both dimensions. Also, other examples may use more than one aperture as a send aperture, with remaining apertures used as receive apertures, and may place the send aperture(s) in locations other than near the center.

In some implementations, the coherent detectors used to detect the light received at each receive aperture are coupled together to perform incoherent combination (also called "incoherent averaging"), where coherently detected phasors are processed to recover amplitudes whose absolute values or squared values are then added together as different components of the combination, optionally with different weights. For example, in some implementations, the coherent detection of each receive aperture can use an In-phase/Quadrature (I/Q) detection configuration using two versions of the LO that are phase shifted with respect to each other by 90 degrees. This yields a two-dimensional phasor (in an I/Q space) with an angle and an amplitude. In some implementations, the coherent detection of each receive aperture can yield a complex-valued transform (e.g., in the frequency domain) of time domain signal (e.g., a photocurrent from a single photodetector or a pair of balanced detectors), which also yields a two-dimensional phasor (in a complex space) with an angle and an amplitude. In either case, the angle of that phasor can be discarded, and the amplitude of the phasor can be recovered for each of the coherent receivers. Over each of the (N−1) receivers, that amplitude (the absolute value of the phasor), or the square of that amplitude, can then be summed or otherwise combined. In some implementations, the values being summed can be weighted in the sum differently for different receive apertures, where the weights may depend on various parameters (e.g., designed target distance). This discarding of the angle of the phasor may sacrifice how quickly a mean value of a detected signal increases, but may provide a more stable signal (e.g., with a lower standard deviation).

Even with a relatively large number of receive apertures, the size of the receive apertures can be kept large enough so that each receive aperture measures an uncorrelated speckle realization, increasing the speckle diversity of the LiDAR receivers compared to a monostatic or bistatic LiDAR system that uses a single receive aperture. As mentioned above, the probability distribution of number of photons collected at each receive aperture is exponential. Also, the noise at each coherent detector has an exponential distribution. Without being bound by theory, one expression for the incoherent combination of k spatially incoherent apertures leads to Erlang distributions for both signal and noise:

$$\text{Noise} \sim \text{Erlang}\ (k,\ 1)$$

$$\text{Signal} \sim \text{Erlang}\left(k, \frac{k}{SNR_{power}+k}\right)$$

Therefore, for high probabilities of detection (i.e., a threshold for a detected power level, or a number of photons being detected), there is a higher probability of false alarm (i.e., the threshold being exceeded due to noise photons rather than signal photons), without incoherent averaging (e.g., with one receive aperture of the same size as the multiple receive apertures) than there is with incoherent averaging. However, for low probabilities of detection, incoherent averaging has the higher false alarm rate. In other words, fewer speckle realizations (lower speckle diversity) is better when the probability of false alarm requirement is less stringent (i.e., a higher probability of false alarm is acceptable). More speckle realizations (higher speckle diversity) is better when the probability of false alarm requirement is more stringent (i.e., a lower probability of false alarm is acceptable).

Another useful feature enabled by the multi-static aperture configuration is that the mixing efficiency of the LiDAR system may be improved at short ranges as the Fraunhofer distance required for far field operation is reached faster for smaller apertures. In other systems, for objects at shorter distances than an assumed target distance, the far field Fraunhofer distance may not have been reached. But, when aperture size is smaller, as in some multi-static LiDAR systems, an object at a shorter distance may still be considered in the far field, and some of the benefits may still apply.

A variety of optimizations can also be made to the individual receive apertures and the optical elements (e.g., OPAs) used within each receive aperture. For example, the collection angle for each receive aperture may be independently tilted. Also, the light collected by each receive aperture can be focused to optimize the performance at different range.

Figure 6:
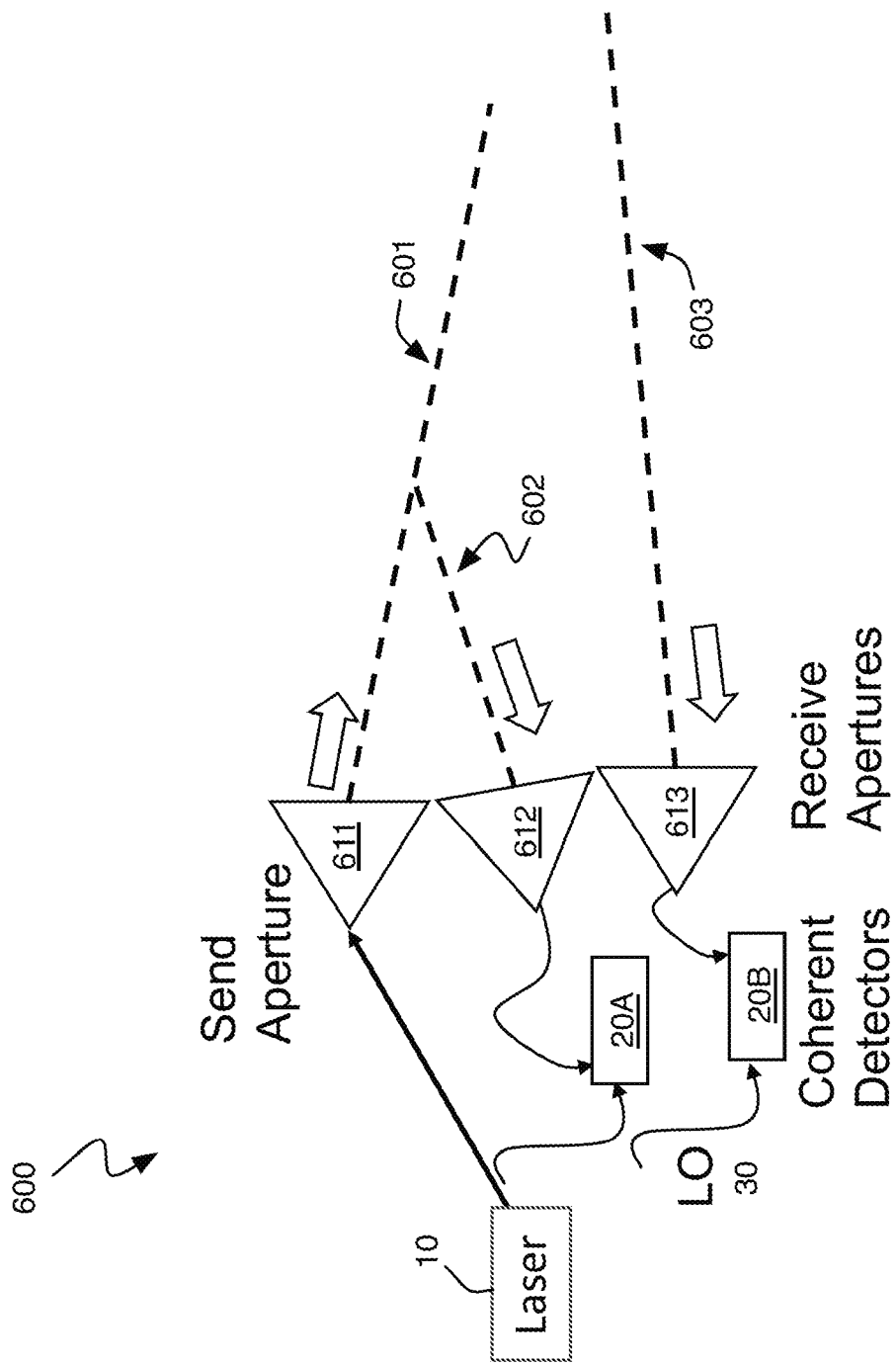
FIG. 6 is a schematic diagram of an example of a multi-static LiDAR system.

FIG. 6 shows an example of a LiDAR system using a multi-static aperture configuration 600. For a given transmission angle 601 from a send aperture 611, a first collection angle 602 into a receive aperture 612, and a second collection angle 603 into a receive aperture 613 can be independently tilted. The potential interference from the laser 10 light into the coherent receivers' 20A, 20B detectors is reduced by using separate apertures for transmit and receive (as in bistatic configurations). In the case where each aperture uses an OPA, the tilt (e.g., using phase steering and wavelength steering to control different angles) and focus (e.g., also using phases) of each OPA may be adjusted on-the-fly to adjust the range at which the LiDAR has the highest mixing efficiency.

Figure 7A:
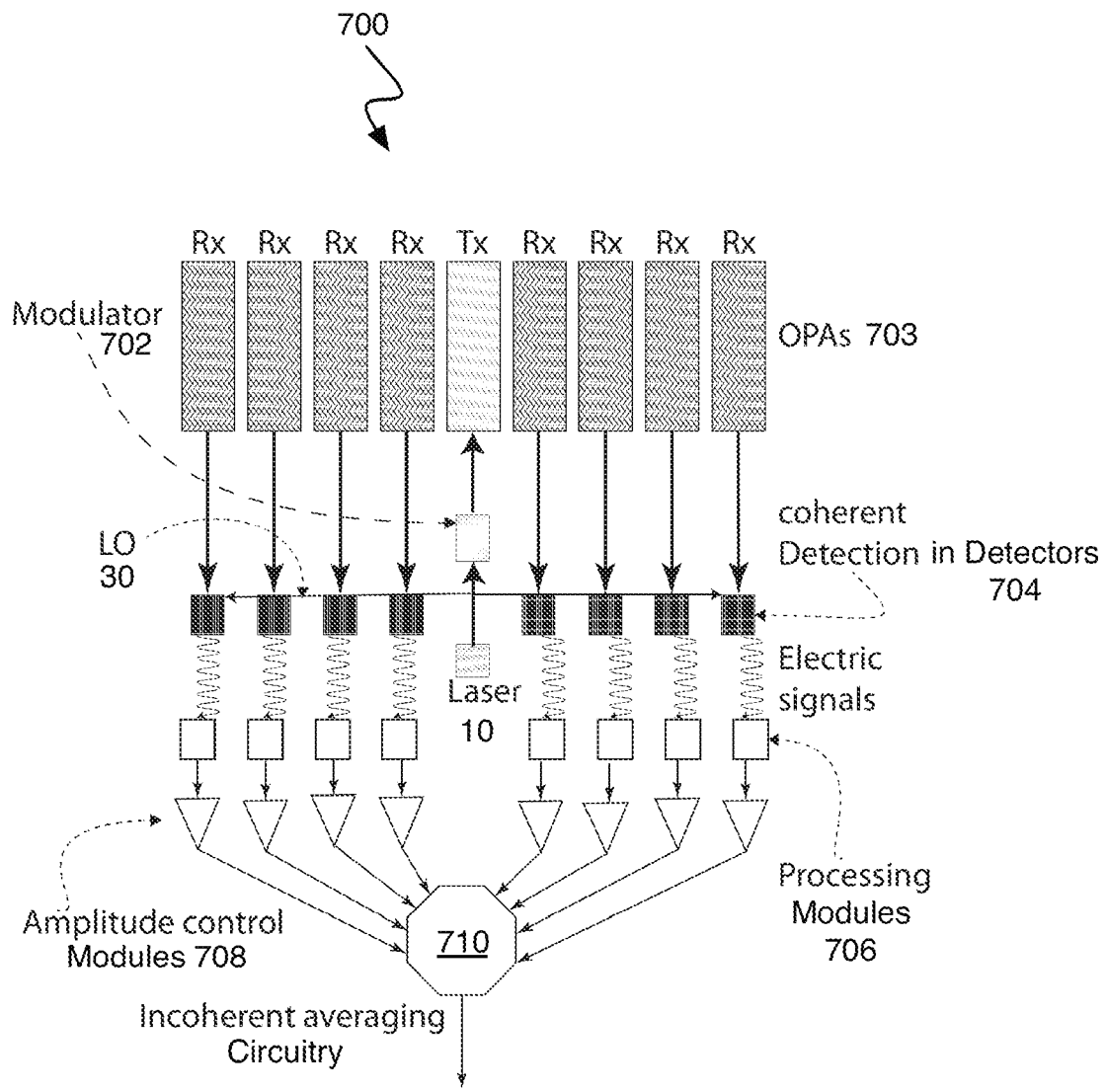
FIGS. 7A, 7B, 8, and 9 are schematic diagrams of various portions of examples of multi-static coherent LiDAR systems.

Another example of a multi-static aperture configuration for a coherent LiDAR system is shown in FIG. 7A. In this example, the laser 10 provides an optical wave that is transmitted from a transmit (Tx) OPA through a send aperture after it has been modulated by a modulator 702 (e.g., using FMCW modulation that imposes a linear chirp on the peak frequency corresponding to the transmitted wavelength). A group of OPAs 703 within respective apertures arranged in proximity to each other include 8 receive (Rx) OPAs that provide different received portions of a collected optical wave arriving at the receive apertures containing the Rx OPAs. The LO 30 is combined with each of the received portions of the collected optical wave, and the resulting combined optical waves are coherently detected by detectors 704. The detectors 704 may be implemented, for example, using balanced detection with photodetectors connected to yield an output current that is a difference between photocurrents generated by the two photodetectors, and/or homodyne detection that imposes a frequency shift on the LO 30 with respect to the peak frequency. The resulting electrical signals provided by the detectors 704 may then be processed in processing modules 706, including processing using analog-to-digital (A/D) conversion where the processing to recover the amplitude and discard the phase angle may be performed digitally. These recovered amplitudes (or the squares of the amplitudes) may also be weighted using amplitude control modules 708. These potentially weighted amplitudes are then be combined using circuitry 710 that is configured to perform the incoherent averaging described herein.

Figure 7B:
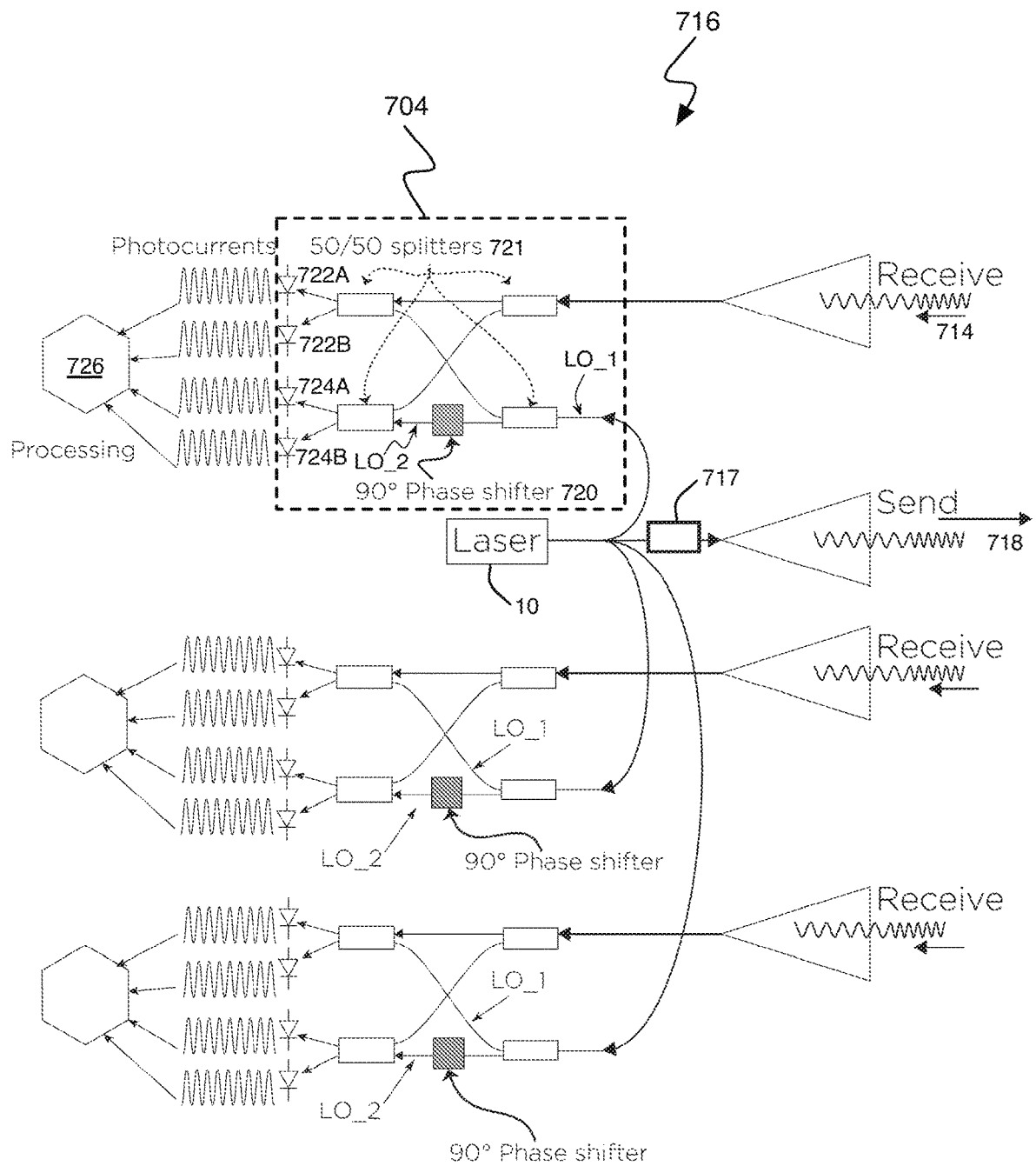

FIG. 7B shows an example of a detector 704 for detecting an optical wave 714 received at a receive aperture, in the context of a LiDAR system 716 that includes other elements including: the laser 10 coupled to modulator 717 for transmitting a modulated optical wave 718 from a send aperture, and other receive apertures and corresponding detectors. The detector 704 includes a 90-degree phase shifter 720 for providing a phase-shifted version LO_2 of an incoming local oscillator optical wave LO_1. A set of 50/50 splitters 721 are able to combine the optical wave 714 with the different versions of the LO to perform I/Q detection. The detector 704 includes a first pair of photodetectors 722A, 722B for detecting an in-phase (I) signal based on a corresponding pair of photocurrents that may be subtracted in a balanced detection arrangement, and a second pair of photodetectors 724A, 724B for detecting a quadrature (Q) signal based on a corresponding pair of photocurrents that may be subtracted in a balanced detection arrangement. From all four of these photocurrents a processing module 726 is able to extract a phase angle and an amplitude associated with the optical wave 714. Other implementations of the detector 704 are also possible.

Figure 8:
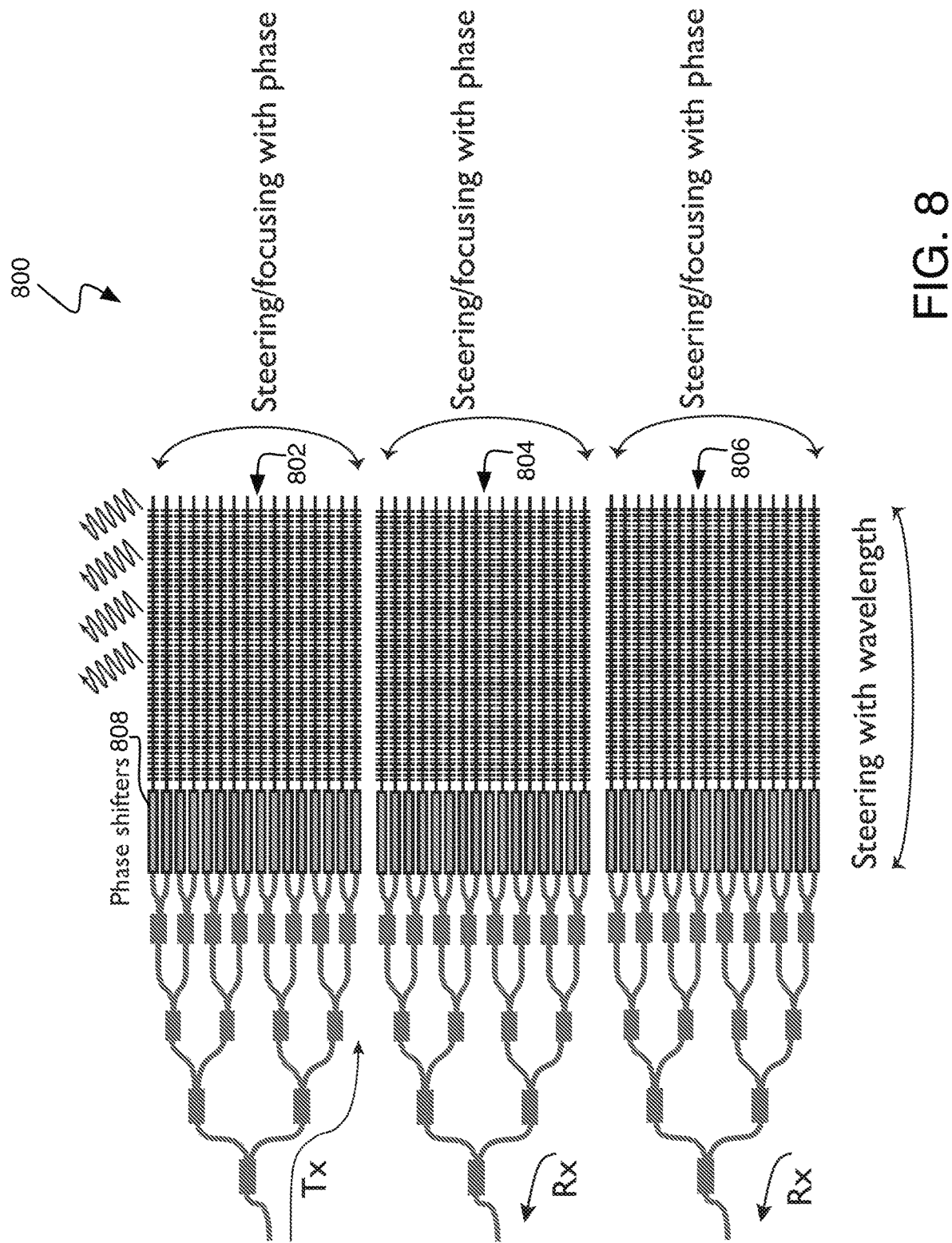

FIG. 8 shows an example of a portion of a multi-static aperture configuration for a coherent LiDAR system 800 that shows a beam steering and focusing arrangement and optical couplers for a transmission (Tx) OPA 802, and two receive (Rx) OPAs 804, 806. Steering can be performed along transverse (e.g., polar and azimuth) angular directions in a polar coordinate system, with the steering in one angular direction being performed by phase shifters 808 and the steering in the other angular direction being performed by wavelength (as shown in FIG. 8). The adjustment of the transmission angle for the Tx OPA 802 and the collection angles for the Rx OPAs 804, 806 in the phase-controlled angular direction can be dynamically performed as the phases imposed by the phase shifters 808 can be quickly tuned. The light beam transmitted by the Tx OPA 802 can have a nonlinear phase front imposed on it by the phase shifters 808. This dynamically adjusted phase front can also tune the focal depth of the Rx OPAs 804, 806. In the longitudinal direction, also, the phased arrays can steer in pre-determined or dynamically adjusted directions but tuning the gratings in this manner might be more challenging or more power consuming. Nevertheless, having multiple receive apertures allows the designer to optimize the system for detecting objects at different distances necessitated by the situation.

Figure 9:
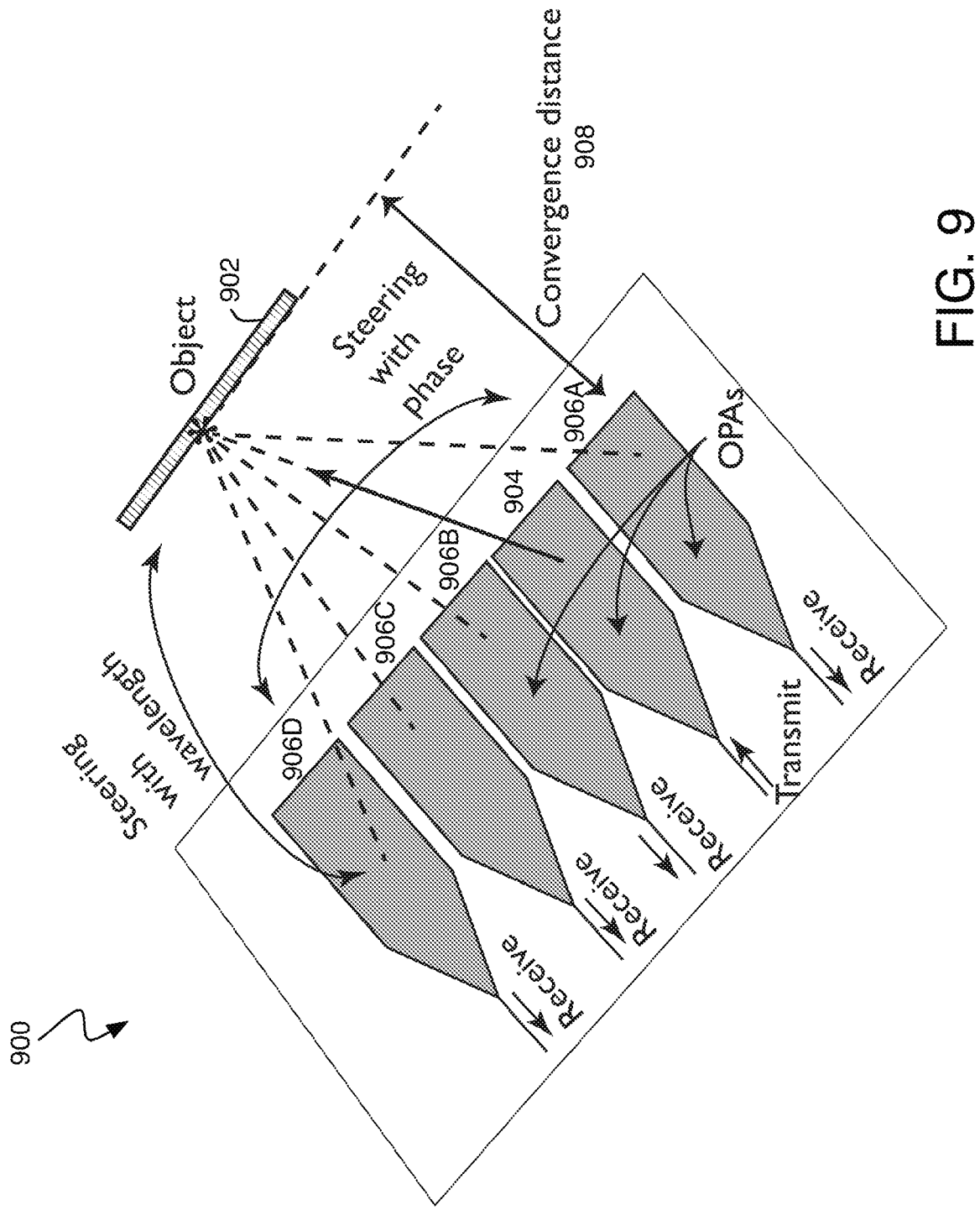

FIG. 9 shows an example of a portion of a multi-static aperture configuration for a coherent LiDAR system 900 that shows a transmission path to an object 902 from a transmit OPA 904 and resulting collection paths from the object 902 to receive OPAs 906A, 906B, 906C, 906D. The paths are spread within a plane that is parallel to an axis along which the apertures containing the OPAs are arranged. In this example, this plane is the same plane in which the phase-controlled angular direction is steered. These paths can be can be collectively configured such that they are aligned to a particular target location which in this example is shown hitting the target object 902 at a particular convergence distance 908. The OPAs can also be focused according to the assumed convergence distance 908.

In some implementations, the apertures within an aperture arrangement can be multiplexed for different center wavelengths (about which frequency modulation and/or frequency steering can be applied). In this manner, a wavelength division multiplexing (WDM) version of a multi-static aperture configuration can assign different combinations of apertures as a send aperture and corresponding receive apertures for different center wavelengths. So, operation for any given center wavelength is able to achieve the operating characteristics described above since the center wavelengths of each wavelength band are far enough apart, with appropriate guard bands between them, such that there is strong isolation (e.g., low leakage) between optical waves (and resulting signals) that use different center wavelengths.

Figure 10:
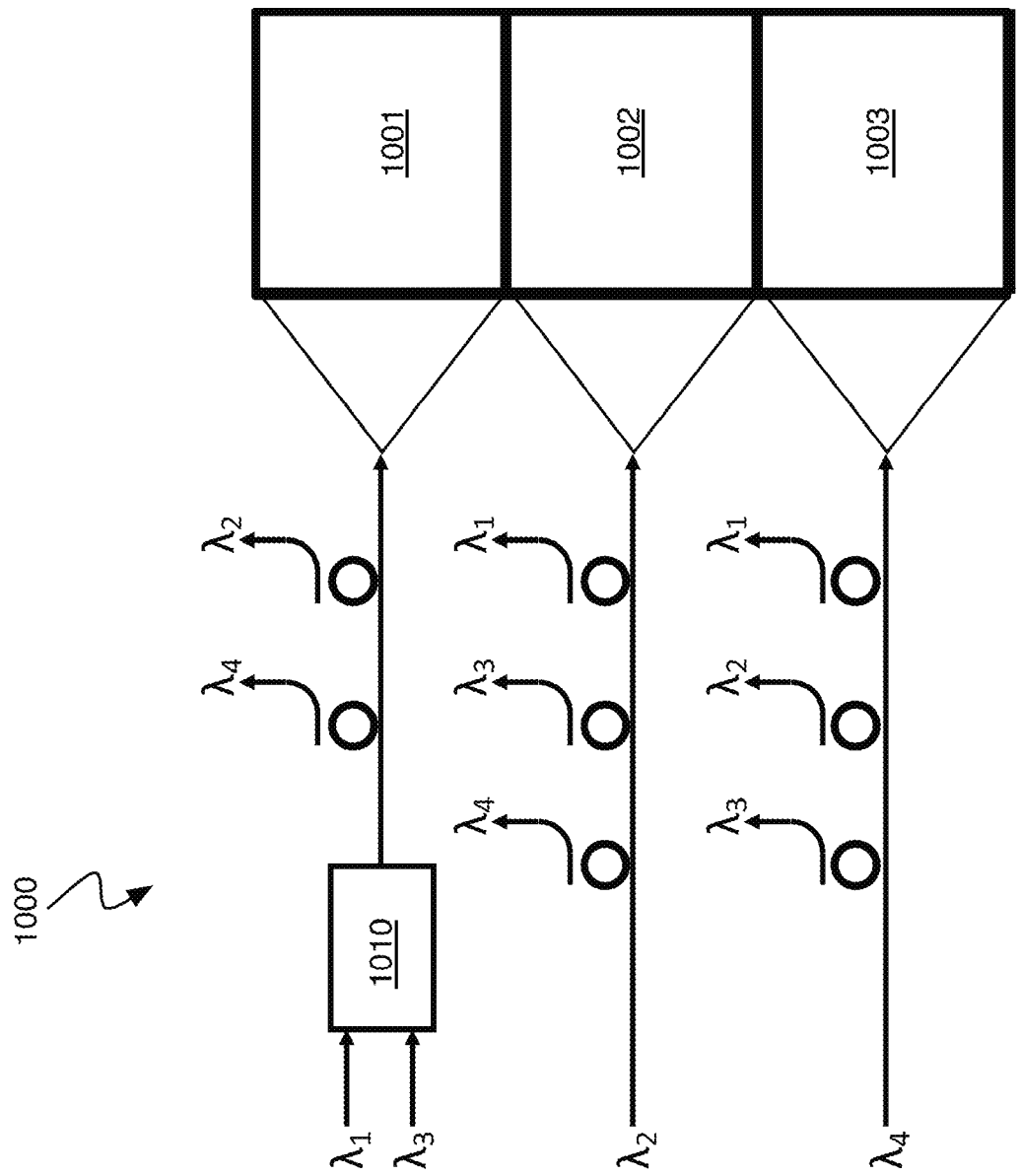
FIG. 10 is a schematic diagram of a WDM version of a multi-static aperture configuration.

FIG. 10 shows an example of a WDM version of a multi-static aperture configuration 1000 in which each aperture transmits a set of one or more wavelength bands and receives all other wavelength bands. In this example, there are four wavelength bands: a first band 1500 nm-1525 nm, a second band 1525 nm-1550 nm, a third band 1550 nm-1575 nm, and a fourth band 1575 nm-1600 nm. An appropriate portion of the ends of each band can be used as guard bands. Some apertures may use a WDM coupler to combine multiple spectral components (or "wavelengths") of an optical wave within different respective spectral bands (or "wavelength bands") for transmission. For example, aperture 1001 combines first and third wavelength bands using a WDM coupler 1010, and apertures 1002 and 1003 each transmit only one wavelength band (the second and fourth bands, respectively), and thus do not use a WDM coupler. The optical pathways in this example include microring resonators as directional wavelength filters for receiving particular wavelengths within particular wavelength bands, as described in more detail below. Alternatively, any other wavelength filters can be used on the receive path to select the wavelengths not transmitted for that aperture.

Some implementations of a multi-static coherent LiDAR system can be configured to use other forms of diversity in addition to, or instead of, the diversity provided by WDM, by using different optical waves that have different characteristics. For example, time-division multiplexing within different time slots can be used, polarization diversity can be provided by using orthogonal polarizations, and space diversity can be used by dividing the area of an aperture into different regions along a first dimension that are used for sending or receiving for different sets of apertures along a second dimension.

As described above with reference to FIGS. 1 and 2, some systems for coherent LiDAR use a single aperture to transmit and receive light (monostatic), and some systems use two apertures in close proximity—one for transmitting and one for receiving (bistatic). Instead, if the size of each aperture is kept the same, by using three or more apertures, it is possible to achieve the high aperture utilization of a monostatic system while maintaining the high isolation of a bistatic system. Furthermore, a multistatic optical phased array configuration (e.g., as shown in FIG. 6) provides speckle diversity to the system (increasing probability of detection) and reduces or eliminates angular gaps in the far-field.

For optical phased arrays that use dispersive antenna elements, steering in one axis is achieved by changing the wavelength of the source (e.g., as shown in FIG. 8). A high-power, broadly tunable laser source that enables a LiDAR built around such an optical phased array may be a challenge for silicon photonics due to (1) the limited spectral range of the available laser gain media, (2) nonlinear losses in silicon waveguides, and (3) the achievable saturation output power of semiconductor optical amplifiers. Coupling a wavelength division multiplexer on transmit and receive modules with a multistatic aperture configuration reduces the complexity of the LiDAR, for example, by possibly reducing the power into any one waveguide, reducing the spectral coverage requirement of any one laser line, and reducing the output power required out of any one laser line.

A remaining challenge in a WDM system is achieving high (e.g., near 100%) coverage of the wavelength band with low-loss. In the transition region between two bands of a typical WDM system, there is a loss penalty between the two sub-bands. By transmitting different wavelengths out of different sub-apertures in a multistatic system, this transition region is significantly reduced or eliminated completely, reducing or removing angular gaps on transmit. On receive, angular gaps can also be eliminated. A narrow-band time-varying wavelength division multiplexer allows high isolation between receive and transmit channels and can be locked to the local oscillator.

In a system having a multistatic aperture configuration, in the presence of speckled returns reflected from a target, each of these sub-apertures measures an independent speckle realization and may be incoherently combined to increase the speckle diversity of the receiver and therefore the probability of detection of the system. In the example of FIG. 7A, the receiver area is 89% of the total aperture area of the system, providing a 2.5 dB increase in receive area with respect to a bistatic system, or only a −0.5-dB penalty in comparison to a monostatic system.

Configurations such as those described herein can serve any of a variety of purposes including: (1) increase speckle diversity of the receiver; (2) increase fractional utilization of receiver with respect to total aperture area (e.g., using WDM); (3) reduce size of angular gaps of system in far-field by increasing spot size (discussed in the spectral coverage section below); and (4) maintain high isolation between transmit and receive by splitting apertures.

As mentioned above, WDM is one technique for improving the field of view and spectral coverage of the laser by utilizing more than one aperture and connecting each aperture to a different source (e.g., different lasers, or different lines of the same laser) covering a different portion of the total optical spectrum.

Figure 11A:
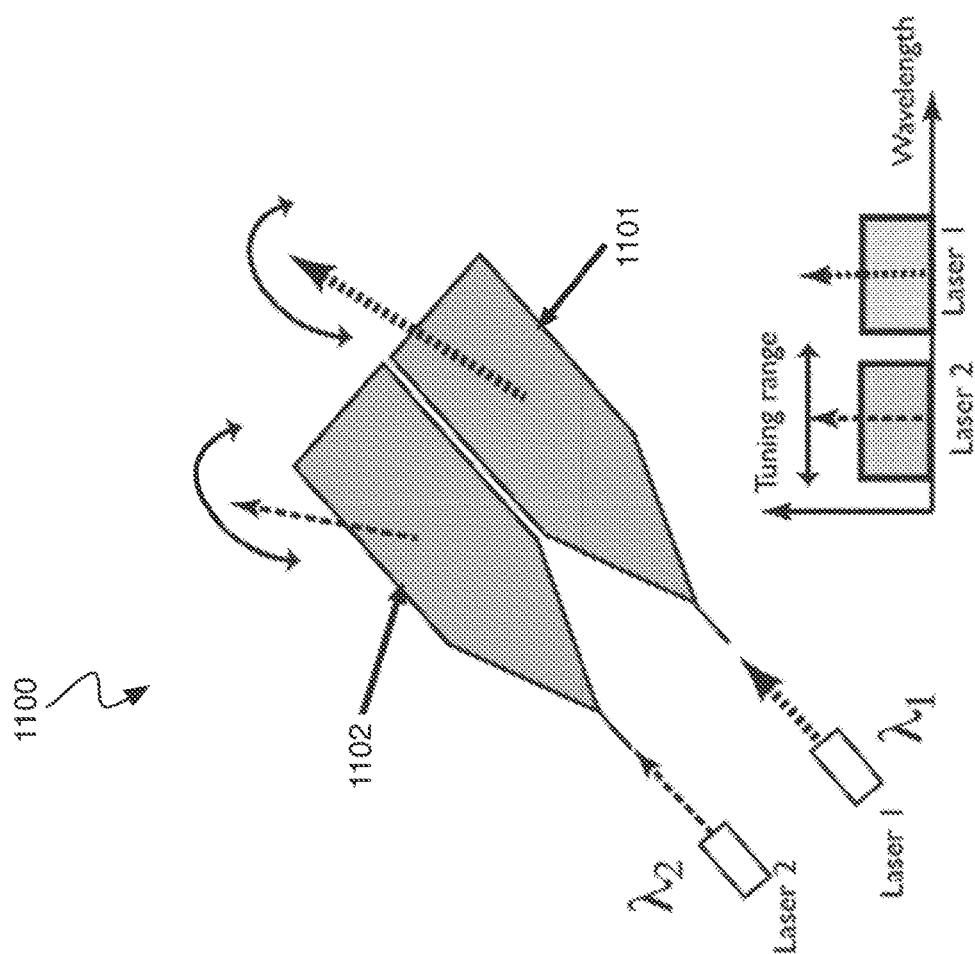
FIGS. 11A and 11B are schematic diagrams of a WDM laser system that uses more than one aperture for different ranges of a spectrum.
Figure 11B:
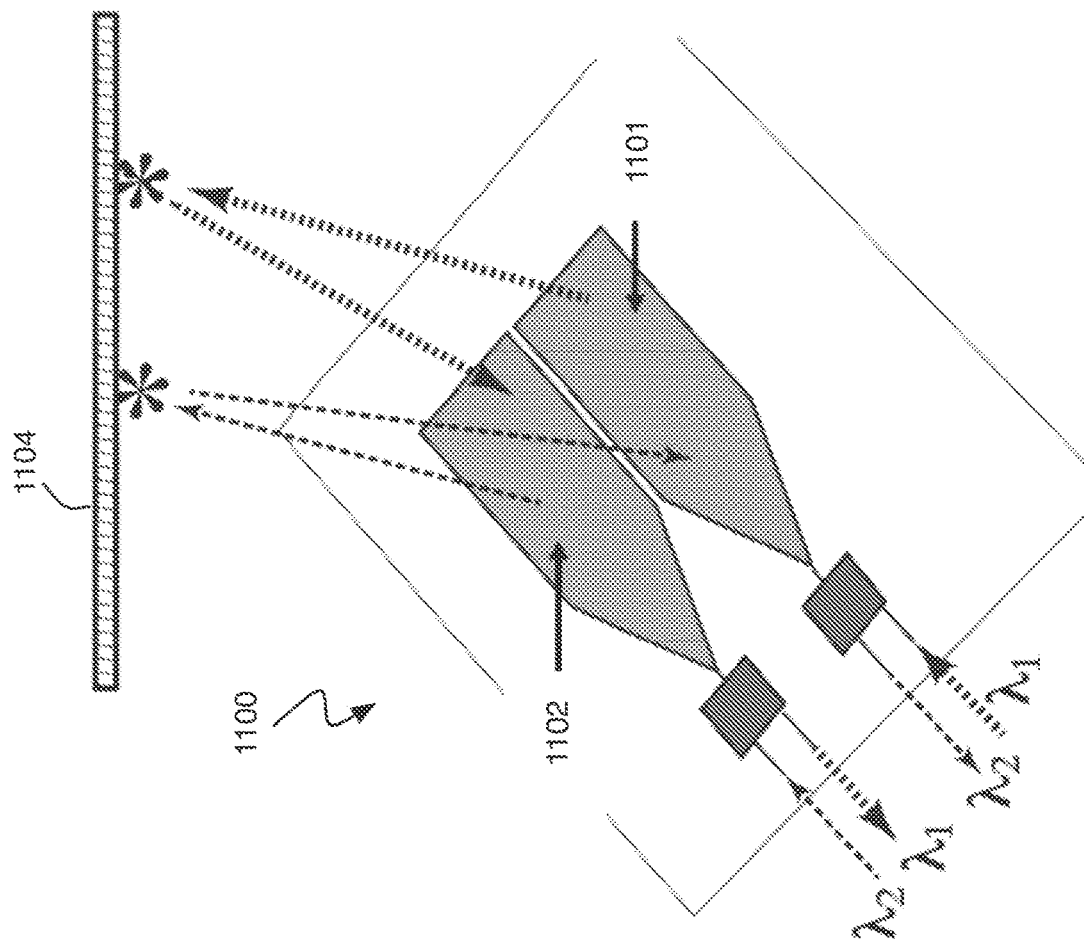

The following are additional examples of a photonic chip with an optical phased array LiDAR, or other laser system, that transmits light of different wavelength bands out of different apertures, with at least two apertures utilized in the transmit regime. FIGS. 11A and 11B show an example of such a structure 1100, which can provide a variety of advantages, including one or more of the following: (1) increase total emitted power of system while keeping individual waveguide power low, (2) distribute emitted power to lower emitted intensity and aid in eye-safety (if the total emitted power is the same), and (3) increase field-of-view of OPA by increasing wavelength coverage.

The receive operation can be performed at one or more of the apertures. For example, one wavelength ($\lambda_1$) can be sent out from laser 1 through one aperture 1101 while the same aperture 1101 is receiving the other wavelength ($\lambda_2$), and that other wavelength can be sent out from laser 2 through another aperture 1102 while the same aperture 1102 is receiving the first wavelength ($\lambda_1$). This approach optimizes the area usage as all of the available aperture is actively sending and receiving light albeit at different wavelengths. FIG. 11A shows an example of different tuning ranges of the two wavelengths from the different lasers. As can be seen in FIG. 11B, the light sent from one aperture backscatters from an object and is received at the other aperture, which reduces crosstalk, as explained in more detail below.

Figure 11C:
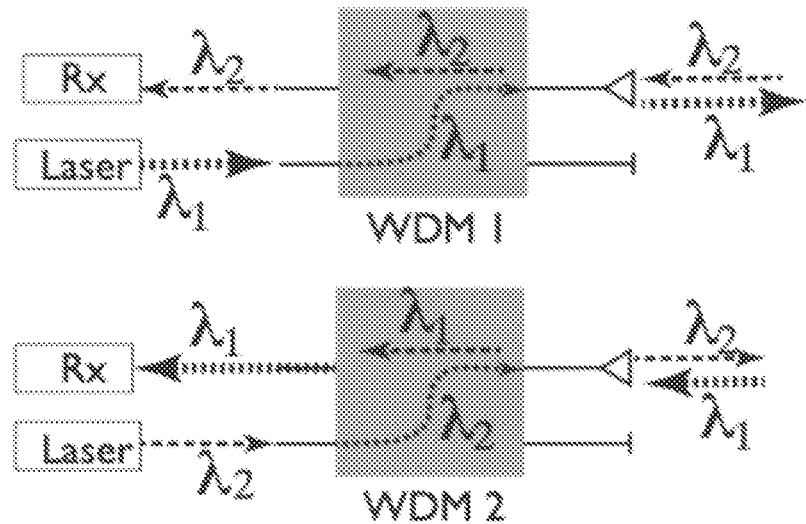
FIG. 11C is a schematic diagram of example WDM components that can be used with the system shown in FIGS. 11A and 11B.

FIG. 11C shows an example of two WDM multiplexer components that can be used for wavelength multiplexing (WDM1 and WDM2) in the structure 1100. These components are configured in such a way that component WDM1 transmits at $\lambda_1$ and receives at $\lambda_2$ and component WDM2 transmits at $\lambda_2$ and receives at $\lambda_1$ in an add/drop multiplexer configuration.

Figure 11D:
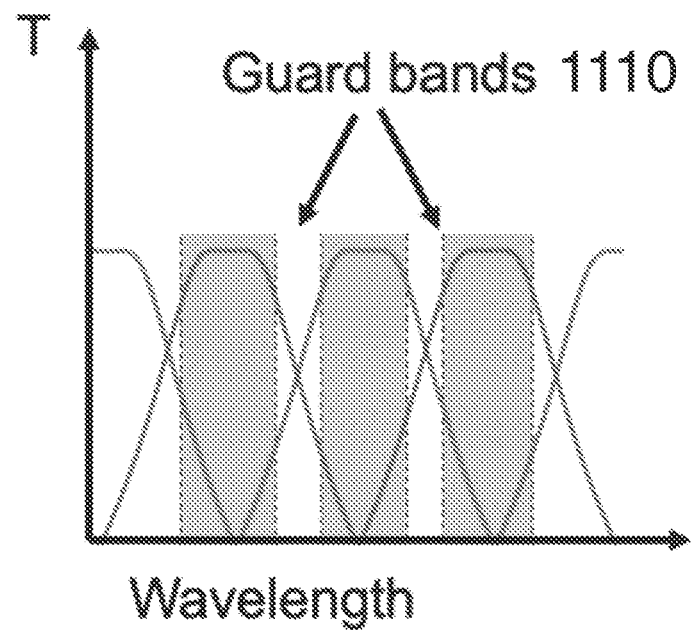
FIG. 11D is an example plot of guard bands in spectral responses of WDM components.
Figure 12B:
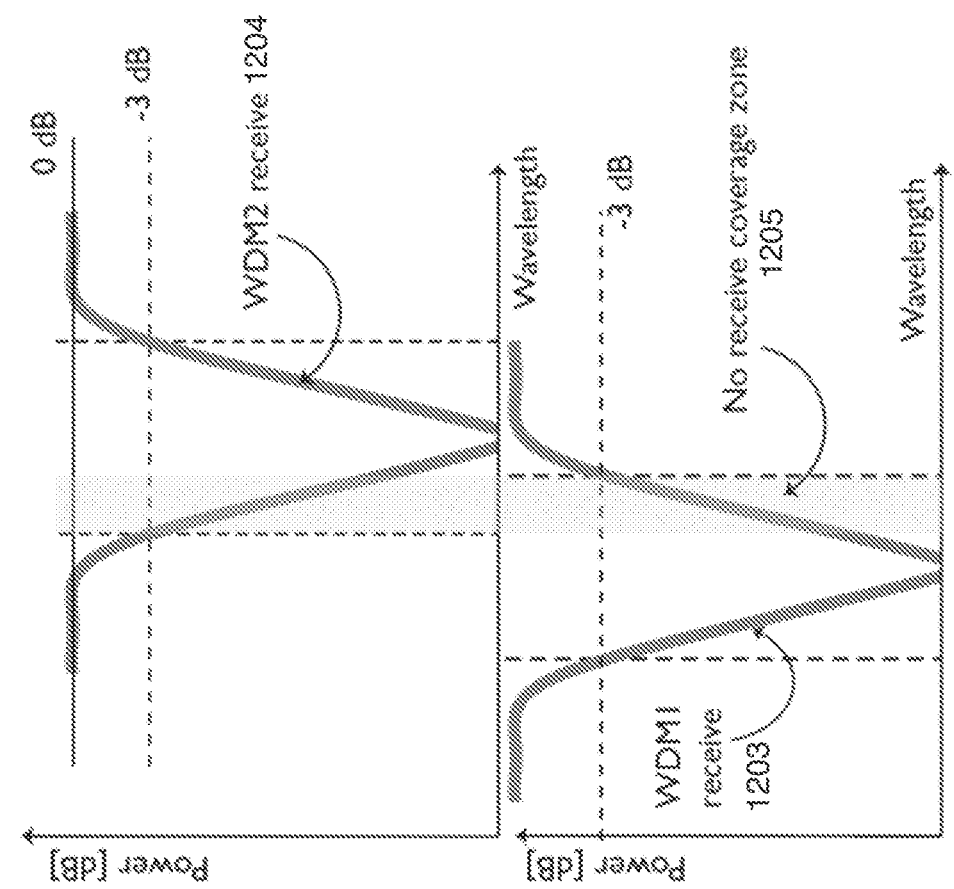
FIGS. 12A and 12B are plots of example spectral responses of drop and through ports of WDM component.
Figure 12A:
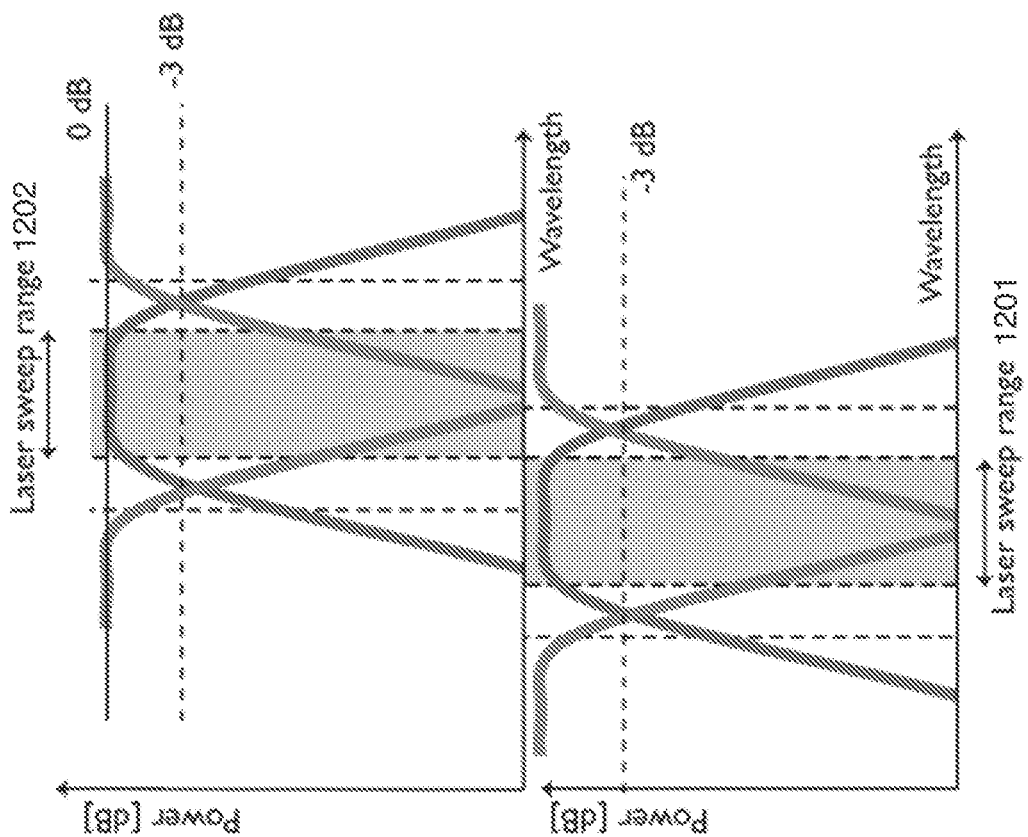

Typically, the spectral response of WDM components such as the coupling components WDM1 and WDM2 and other wavelength-dependent filters do not necessarily have an ideal, box-like shape. Therefore, there is an area in between the adjacent alternating spectral responses of the WDM components WDM1 and WDM2 shown in FIG. 11D in which there is a higher rate of loss and cross-talk (between the shaded regions of high transmission (T) as a function of wavelength). As can be seen in FIG. 12A, the lasers driving each of the apertures can be scanned over the respective laser sweep ranges 1201 and 1202 shown in the shaded regions. The sweep ranges (also called "scanning ranges") of the lasers can overlap, or can be aligned to be adjacent without overlap as shown in FIG. 12A. The drop responses for the transmit port (i.e., the drop port) of the two WDM components are shown with the curves that have high power (around 0 dB) over the laser sweep ranges 1201 and 1202 of the lasers so that there is little or no transmission loss. The through responses for the receive port (i.e., the through port) of the two WDM components are shown with the curves that have low power over the laser sweep ranges 1201 and 1202. As can be seen in FIG. 12B showing only the through/receive responses 1203 and 1204 for the WDM1 component and the WDM2 component, respectively, even if the sweep range of the two lasers are aligned perfectly, there is still a dead region 1205 in which there is no adequate receive coverage due to the WDM spectral responses being low (below −3 dB) in receive power level.

Figure 13:
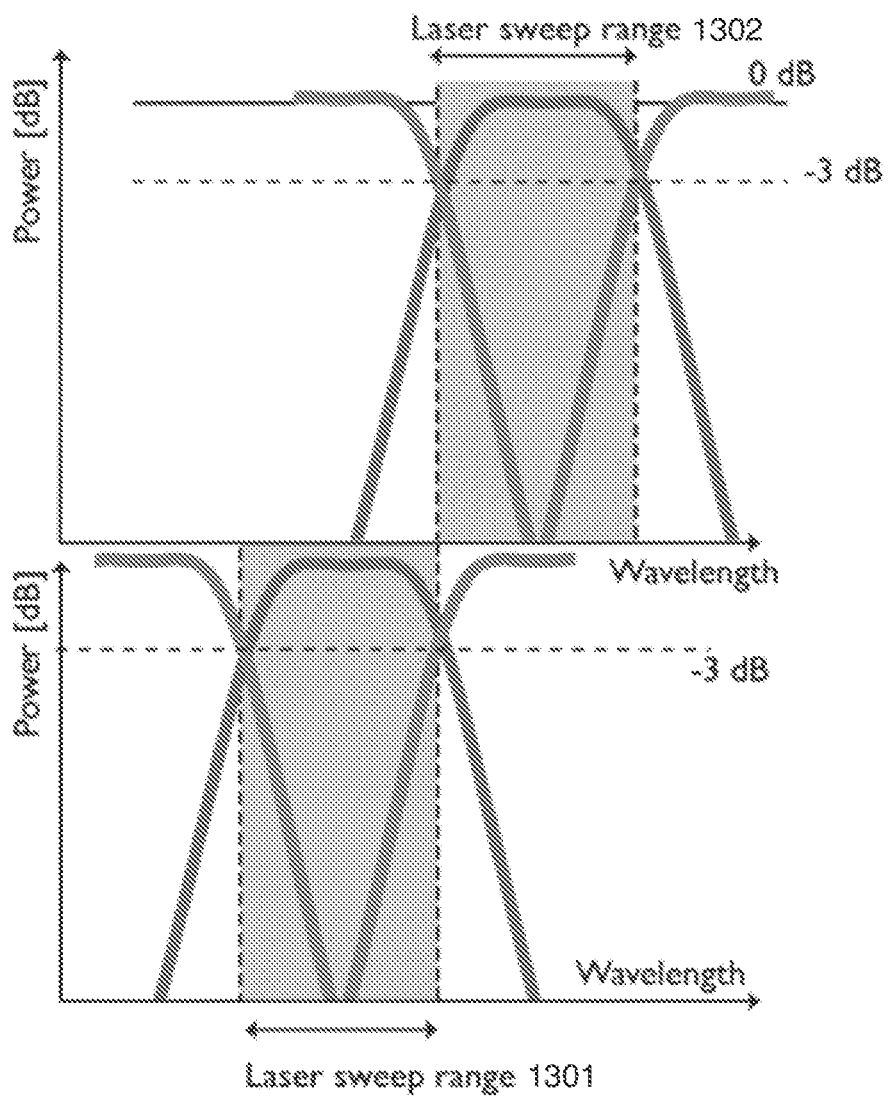
FIG. 13 is a plot of an example of wider transmission bands.

As can be seen in FIG. 13, if the laser in each of the apertures is swept across the wider shaded regions that are extended to the −3 dB power reduction levels of the spectral responses of the WDM components, there is no actual dead regions of high loss, but the laser light can experience up to 3 dB of power reduction in transmit and 3 dB of power reduction in receive.

One technique for mitigating the guard band dead regions of high loss is to increase the number of apertures and making sure that the wavelength ranges that are not covered by apertures/receivers in one part of the system are accounted for by one or more of the other apertures/receivers in the system.

Figure 14:
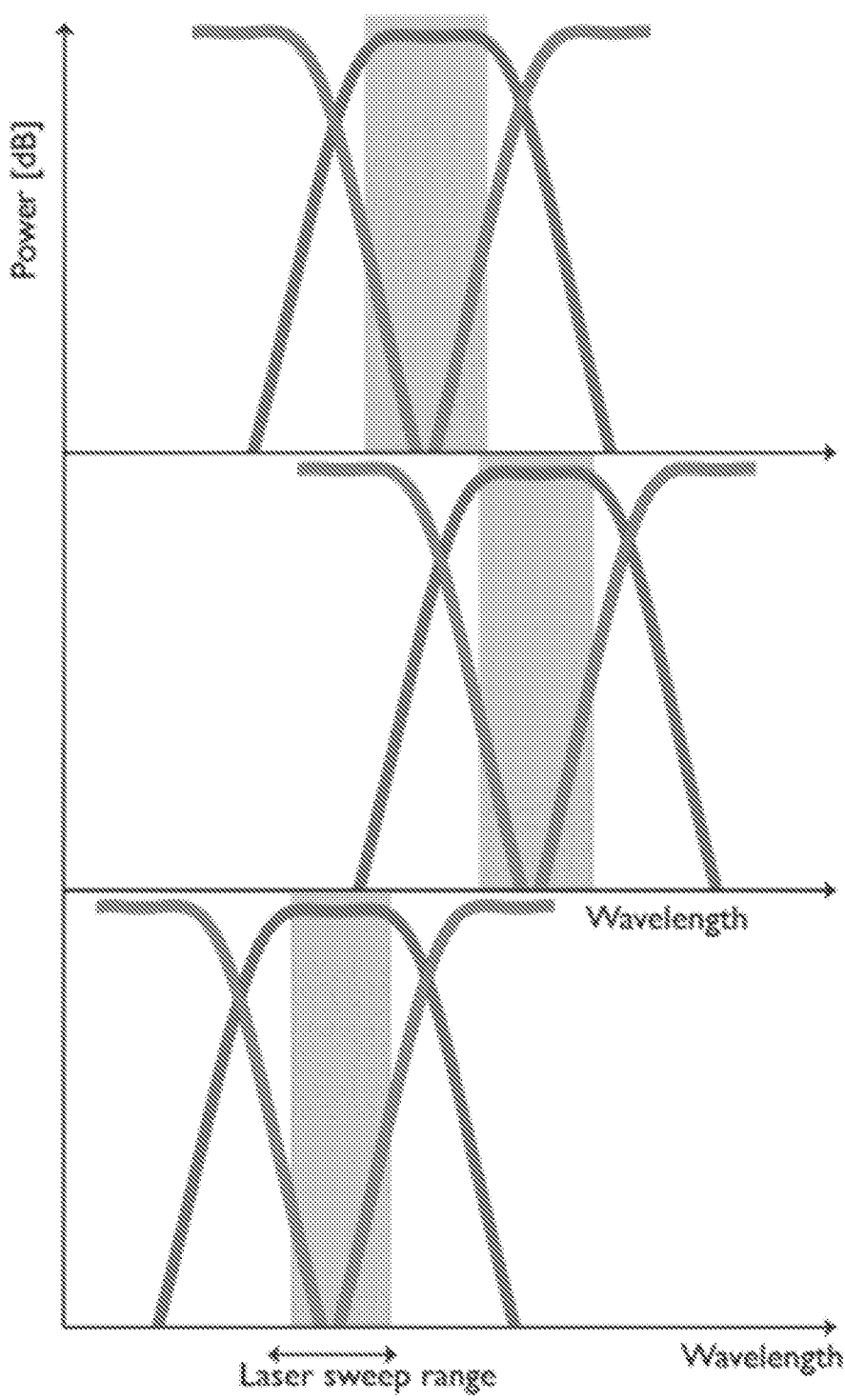
FIG. 14 is a plot of an example of closely aligned transmission bands.

For example, as shown in FIG. 14, three WDM components with shifts in their spectral responses can create a system in which all of the wavelengths are covered at relatively high transmit power levels (shown over the shaded regions), and each laser is detected by at least one aperture/receiver at a time at a relatively high receive power level. Nevertheless, these systems can still suffer from a lack of spatial efficiency as at certain wavelengths only a third of the lidar total area is detecting a certain channel.

In some implementations of the techniques disclosed herein, the receive circuitry includes a tunable WDM component (e.g., a tunable filter) locked with the corresponding transmit wavelength being received. One way to accomplish this issue is to have only transmitted light go through the WMD multiplexers (e.g., fixed WDM multiplexers) and the receive light is detected before it reaches the WDM multiplexers.

For example, a general example transmit and receive WDM architecture for the system includes at least two apertures, and transmits light at a set of one or more wavelength band(s) in each of one or more of those apertures. Also, each aperture is configured to receive light at a set of wavelength band(s) complementary to the transmit band(s) for that aperture. Such an architecture can be used, for example, to configure a LiDAR system to achieve advantages which may include: a speckle-diversity receiver, high aperture fill-factor, wide field-of-view, low loss, and/or no field of view coverage gaps.

Such an architecture can be implemented on a silicon photonic chip, for example, to provide an optical phased array LiDAR system that uses wavelength division multiplexing on transmit to combine multiple laser lines into a single optical phased array aperture.

In some implementations, a tunable wavelength division multiplexing optical circuit can be configured to use a tunable photonic ring and light detectors to lock a receive circuit onto the wavelength of the local oscillator, as described in more detail below.

Figure 15:
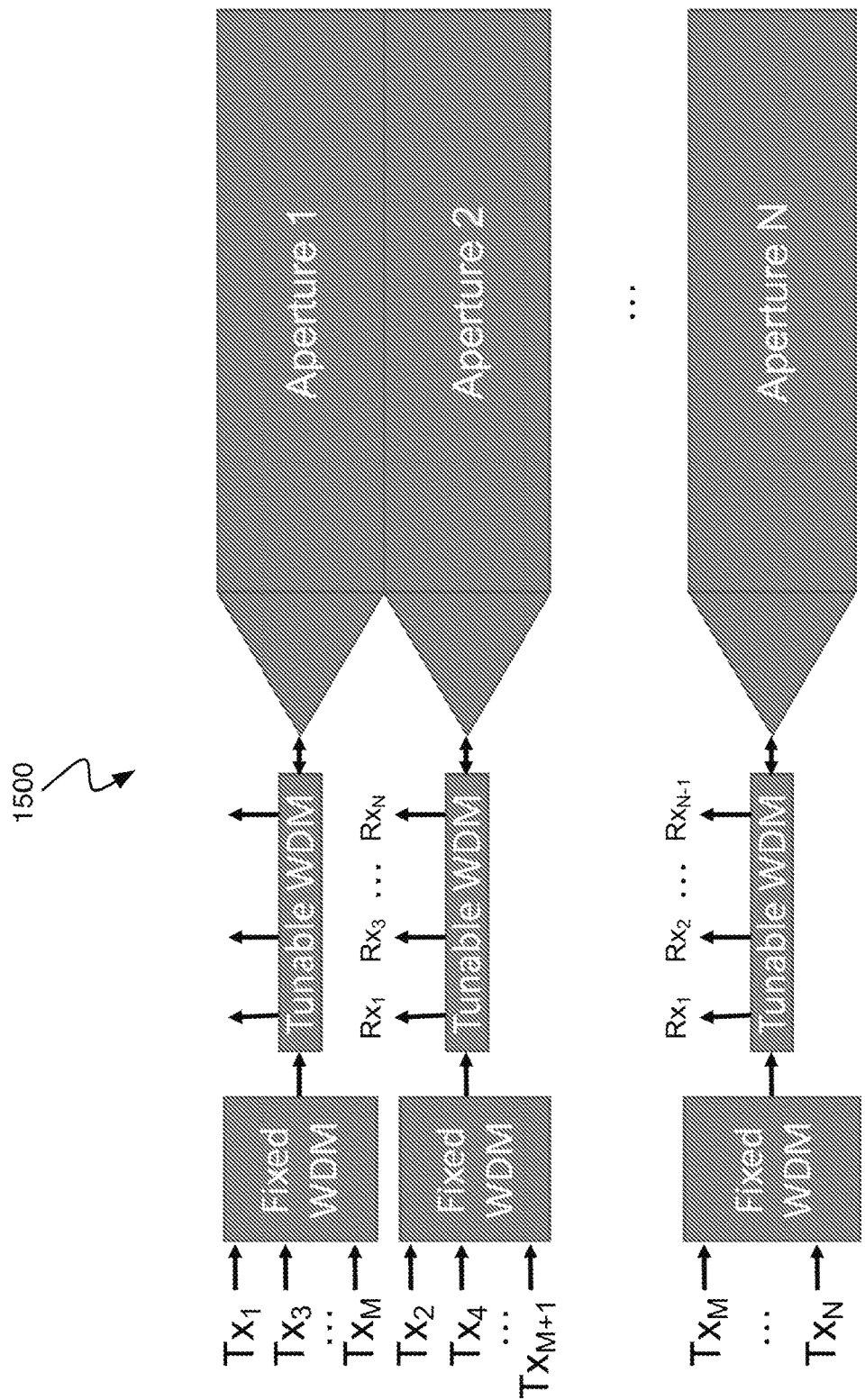
FIG. 15 is a schematic diagram of a generalized WDM version of a multi-static aperture configuration.

As a generalization of the example shown in FIG. 10, FIG. 15 shows a configuration 1500 arranged in a way that each aperture transmits a set of wavelength bands and receives all other wavelength bands. Each wavelength band defines a channel that can be used for transmitting (as a transmit band) at one aperture, and for receiving (as a receive band) at another aperture. To avoid loss in transmission from the WDM multiplexers, each of the transmit bands (such as $Tx_1$ and $Tx_3$) are separated by at least one channel as a guard band. Receive bands are tuned to follow a wavelength of a transmit laser sent from other apertures. For example, in FIG. 15, the aperture on the top transmits ($Tx_1$, $Tx_3$, . . . ) and receives ($Rx_2$, $Rx_4$, . . . ). The channels received at aperture 1 are not transmitted from the same aperture, and the tunable WDM (filter bank) response follows the wavelengths of ($Tx_2$, $Tx_4$, . . . ) emitted from other apertures. It is noteworthy, that if only one wavelength (for a particular channel/wavelength band) is transmitted from each aperture, all the other channels can be received from the same aperture and no WDM multiplexer in the transmit portion of the optical system (i.e., the transmitter subsystem) for that aperture is necessary. For example, as can be seen in FIG. 10, if the system is configured to transmit $\lambda_1$ (in the range 1500-1525 nm) from the first aperture 1001, the second range of wavelengths transmitted from the same aperture 1001 should have some wavelength separation from this range (for example, $\lambda_3$ is in the 1550-1575 nm range). The WDM coupler 1010 (e.g., a fixed WDM multiplexer) utilized in the first aperture, therefore, can have a lossy response in the $\lambda_2$ (in the 1525-1550 nm range, serving as a guard band for this aperture) without effecting the transmit power in either of the $\lambda_1$, $\lambda_3$ ranges. The fourth wavelength range in this example corresponds to $\lambda_4$ in the 1575-1600 nm range. Note that these wavelength ranges are given as examples and the actual wavelength ranges can be what suits the application and the design restrictions.

In the example shown in FIG. 10, not all apertures require a WDM coupler such as the coupler 1010 used for aperture 1001 (or other fixed WDM multiplexer) for the transmit channels. For example, apertures 1002 and 1003 each transmit only one channel and thus do not need a fixed WDM multiplexer. The microrings (or any other tunable wavelength dropping filters) can be used on the receive paths of the receive portion of the optical system (i.e., the receiver subsystem) to select the wavelengths not transmitted from that aperture. For examiner, in the case of a microring used as a tunable filter, the free spectral range (FSR) corresponding to the wavelength distance between high transmission peaks, can be selected to be large enough to span each wavelength band (e.g., at least 25 nm for the example wavelength bands given above). The potential reasons for not attempting to receive light in a particular channel transmitted from a particular aperture from light in the same channel collected at the same aperture include the following: 1) the transmitted light is usually orders of magnitude stronger than the collected light and tuning a filter to the wavelength that is being transmitted can damage the filter or cause nonlinearities in its optical response; 2) if the receive filter picks up a certain wavelength in the return path, it does affect the same wavelength in the transmit path and induces unwanted loss on the transmission; 3) the transmitted light being much stronger, any backscattering from the aperture dominates the received light at the same wavelength.

Figure 16A:
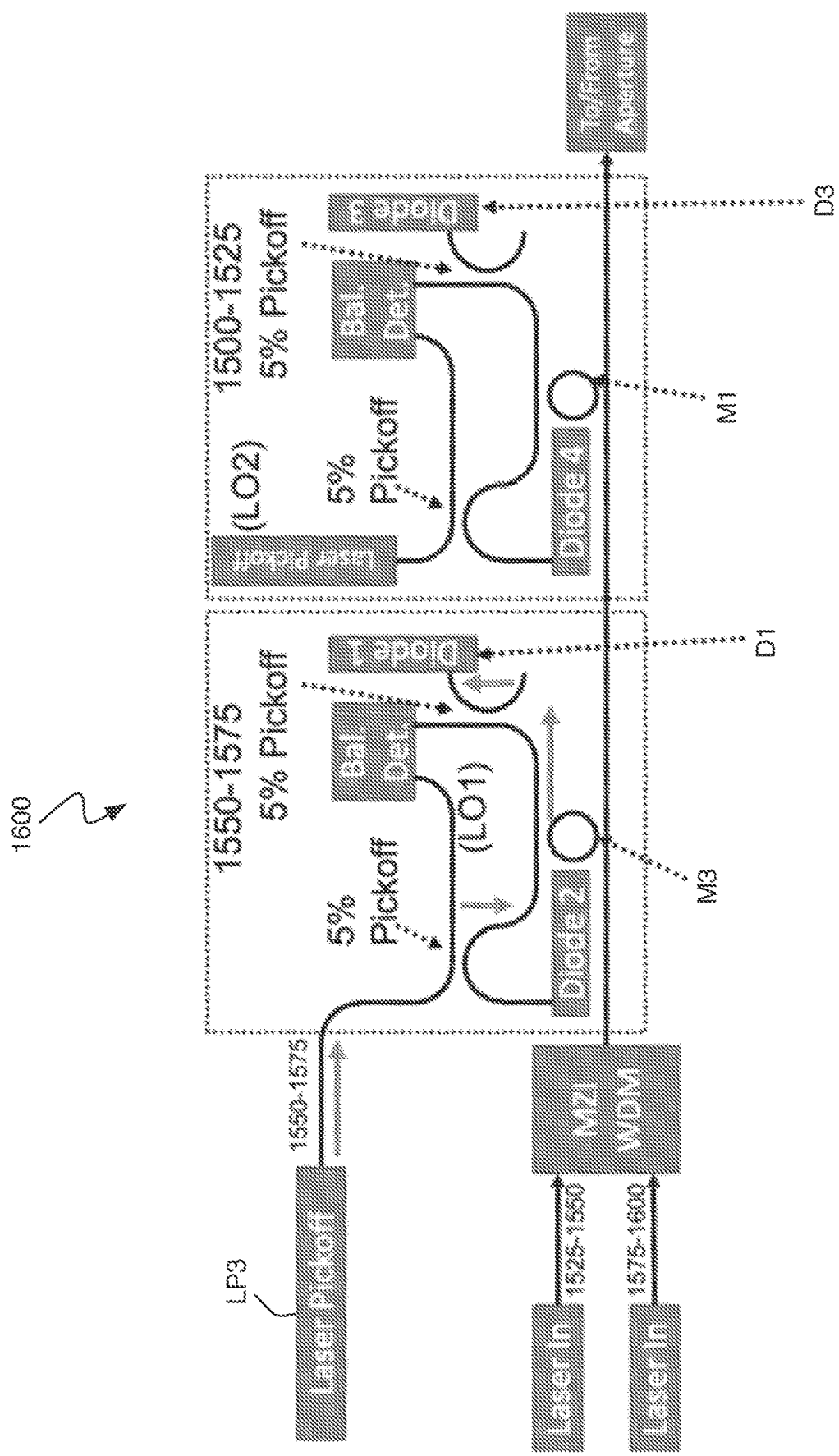
FIG. 16A is a schematic diagram of an example WDM system for a particular aperture.
Figure 16B:
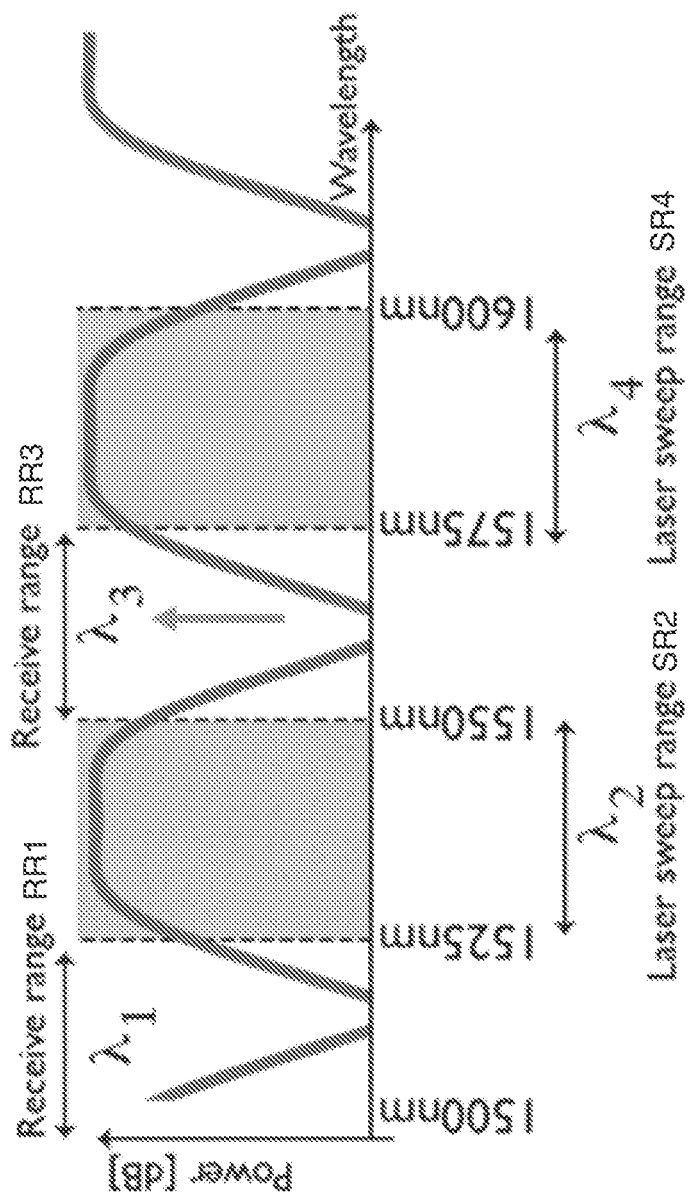
FIG. 16B is a plot of example wavelength bands transmitted and received in the system of FIG. 16A.

A potential technical challenge is that the receive tunable WDM components (e.g., tunable filters) should be synchronously tuned (e.g., locked) to the transmitting wavelengths from other apertures. Some implementations can be configured to use local oscillator light generated from the transmitted light as a reference for tuning. For example, with reference to FIGS. 16A and 16B, a WDM system 1600 (FIG. 16A) for a particular aperture is designed to transmit light in the shaded wavelength regions (FIG. 16B) of the laser sweep range SR2 (1525-1550 nm) and the laser sweep range SR4 (1575-1600 nm). Therefore, the wavelength regions of the receive range RR1 (1500-1525 nm) and the receive range RR3 (1550-1575 nm) can be received in the return path. One tunable microring is used to pick up the return signals in each receive range RR1 and RR3, respectively. The microring M3 is tuned to the laser LP3 in the RR3 (1550-1575 nm) range, and the microring M1 is tuned to the laser LP1 in the RR1 (1500-1525 nm) range. A portion of the laser light from these lasers (used for transmission at other apertures and for "pickoff" at this aperture) is injected into the receive blocks as local oscillators (LOs). As indicated by the arrow at a wavelength near the middle of the receive rage RR3 in FIG. 16B, and corresponding arrows shown in FIG. 16A following the path of light of that wavelength, if the portion of the local oscillator light picked off by the 5% directional couplers is minimized at photodetector D1 (e.g., a photodiode detector) by tuning the microring M3, the microring M3 will be locked to the local oscillator signal and will therefore pick up the correct return signal from the aperture. A similar tuning procedure can be performed for tuning microring M1 by minimizing photodetector D3. A potential advantage of this tuning procedure over one that tries to maximize the collected return signal is that it eliminates the chance of locking to the wrong laser line as there are several transmitted/backscattered and collected laser lines on the return path.

Figure 17:
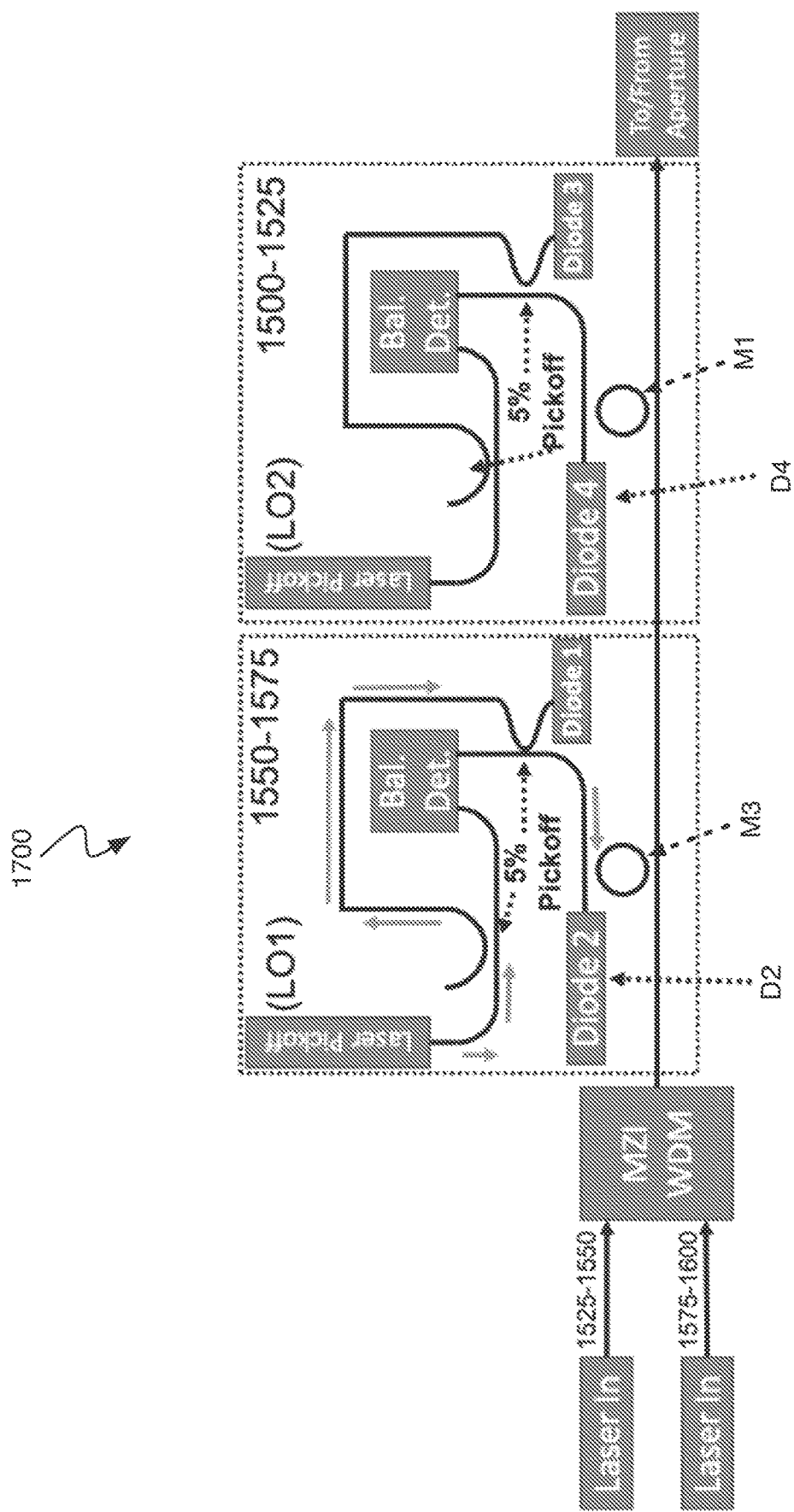
FIG. 17 is a schematic diagram of an alternative WDM system.

A similar but slightly different WDM system configuration 1700 is shown in FIG. 17. The difference between the systems 1600 and 1700 is that the photodetectors D2 and D4 in system 1700 are minimized to ensure locking to the transmitted laser. This particular aperture of system 1700 is also designed to transmit light in the wavelength ranges SR2 (1525-1550 nm) and SR4 (1575-1600 nm). Therefore, the wavelength ranges RR1 (1500-1525 nm) and RR3 (1550-1575 nm) can be received in the return path. One microring M1 and M3 is used to pick up the return signal in each wavelength range, respectively. The microring M3 is tuned to the laser in the RR3 (1550-1575 nm) range, and the microring M1 is tuned to the laser in the RR1 (1500-1525 nm) range. A portion of the laser light from these lasers is injected into the receive blocks as local oscillators (LOs). As in FIG. 16A, in FIG. 17 the arrows show the path of the injected light, and if the portion of the local oscillator light picked off by the 5% directional couplers is minimized at photodetector D2 by tuning the microring M3, the microring M3 will be locked to the local oscillator signal and will therefore pick up the correct return signal from the aperture. A similar tuning procedure can be performed for tuning microring M1 by minimizing photodetector D4.

Figure 18:
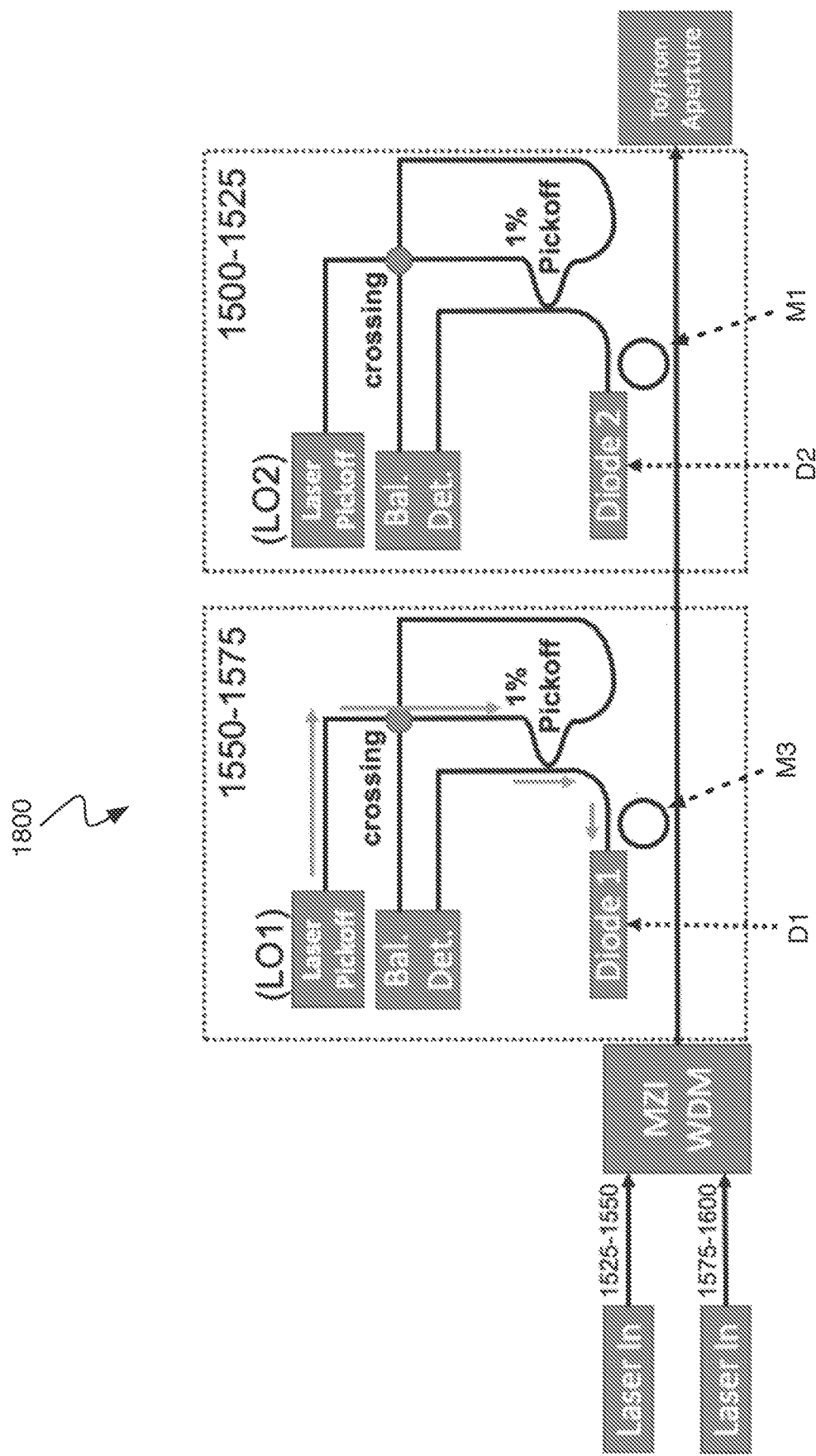
FIG. 18 is a schematic diagram of an alternative WDM system.

A similar but slightly different WDM system configuration 1800 is shown in FIG. 18. Similar to the system in FIG. 16A, the photodetectors D1 and D3 are minimized to ensure locking the tunable wavelengths of the microrings M1 and M3 to the transmitted laser wavelength (being transmitted from another aperture) that is being picked off.

A variety of other techniques can be used to ensure that apertures in a LiDAR system can transmit and receive light in different parts of the optical spectrum at the same time. The wavelength ranges can be adjusted in a way that no spectral range is blocked. Fixed WDM devices can be used to combine the transmitted light into the output, and tunable filters can be used on the receive path to selectively detect each received band. To lock the tunable filters to the transmitted laser wavelength (for other apertures) at each moment in time, a portion of the local oscillator light can be utilized as a wavelength reference. It is beneficial to minimize the local oscillator light at the reference photodetector to ensure no other laser line is picked up by accident.

In LiDAR systems depending on wavelength sweeping for covering a large field of view, the techniques described herein for combining different respective wavelength ranges from multiple lasers to increase the overall wavelength range and field of view beyond what is possible with a single laser and gain medium can have any of a variety of advantages.

For example, some implementations have one or more of the following advantages:

Capability: Many laser lines increase points per second.
Robustness: Partial spectral coverage per laser improves performance over temperature.
Capability: In silicon waveguides, 200 nm total spectral coverage around 1550 nm enables 24°+ vertical FOV.
Cost Savings: Receive apertures use 75% of total aperture area.
Robustness: Self-calibration structures ensure performance over temperature and lifetime.
Safety: Multi-aperture receiver with speckle diversity can increase probability of detection by 2 times.

A challenge in multichip sweeping system is achieving 100% coverage of the wavelength band with low loss, as explained above.

Figure 19:
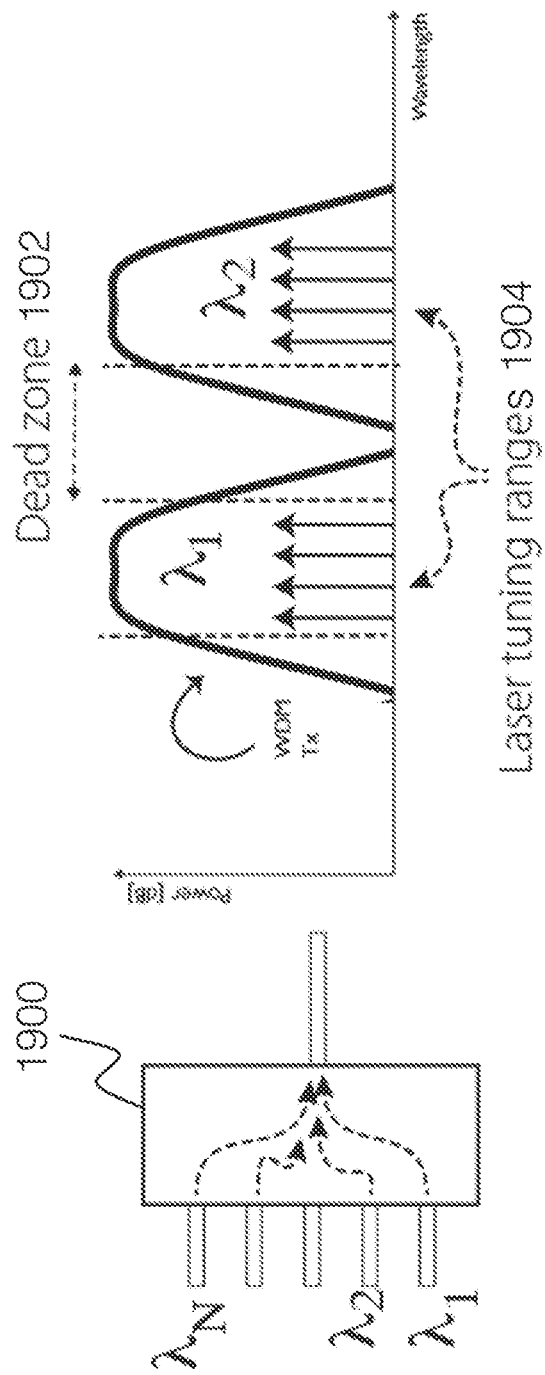
FIG. 19 is a plot of an example wavelength bands for a WDM multiplexer with a dead zone in between the bands.

As shown in FIG. 19, for a single WDM multiplexer 1900, there may be a dead zone 1902 between the laser tuning ranges 1904 for channels combined by the WDM multiplexer 1900, as described above.

Figure 20:
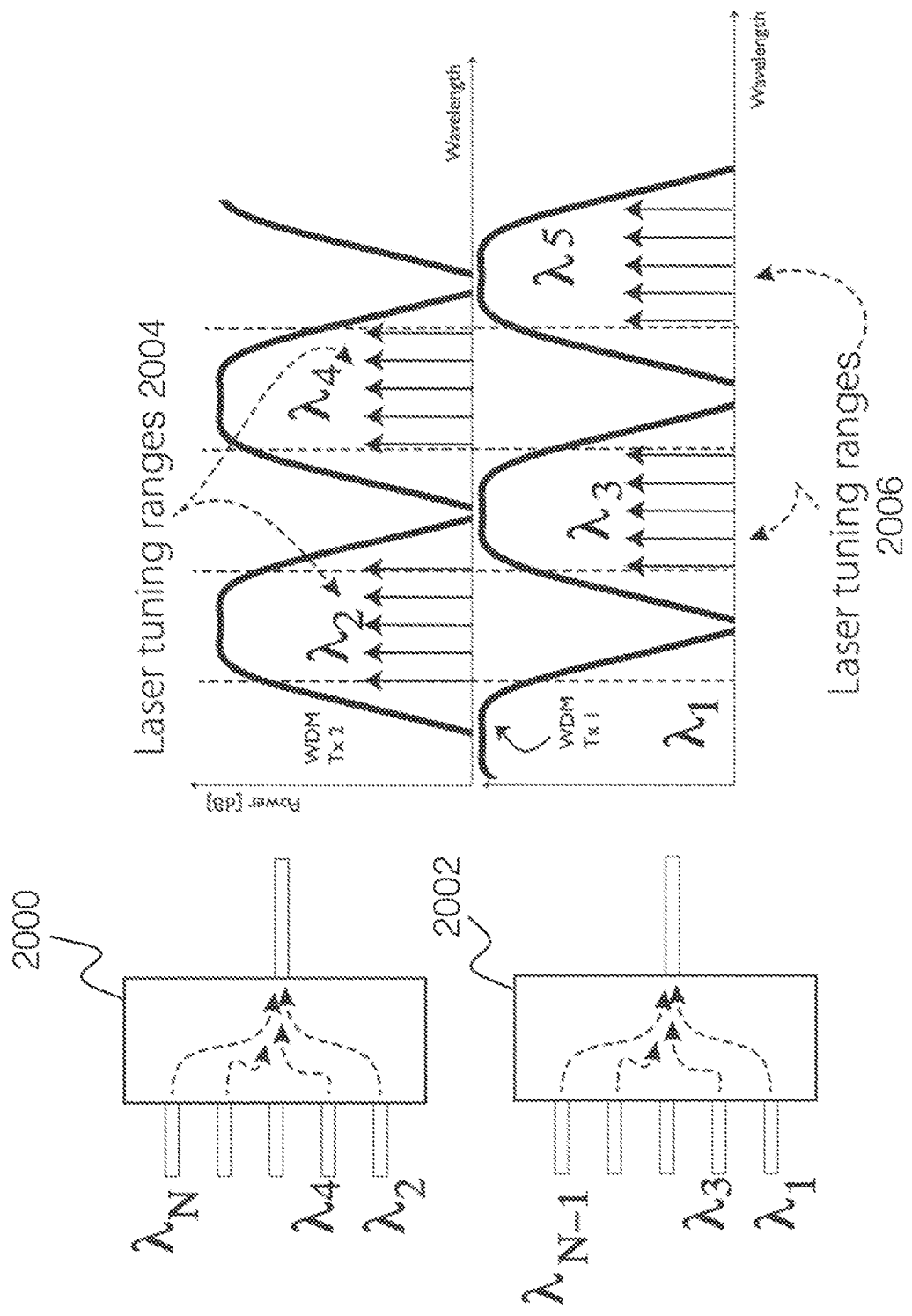
FIG. 20 is a plot of example interleaved wavelength bands for two WDM multiplexers.

Alternatively, as shown in FIG. 20, utilizing more than one WDM multiplexer for different respective apertures can ensure that more of the spectrum (e.g., including the dead zone part of the spectrum between the WDM channels) is covered by the other WDM multiplexers. So, a dead zone in one WDM component (used as a first multiplexer 2000) is substantially aligned with a passband in another WDM component (used as a second multiplexer 2002). Within each passband, the wavelength of a corresponding laser can be swept to cover substantially the entire passband. This pair of multiplexers then provides a substantially continuous range of wavelength tunability for a transmitter system, as shown with the laser tuning ranges 2004 of the first multiplexer 2000 and the laser tuning ranges 2006 of the second multiplexer 2002, interleaved without any dead zones in this example. The resulting optical wave can be used for a transmission signal and for a corresponding local oscillator signal that will be used for coherent reception in a receiver system. A filter in the receiver system (e.g., a microring resonator) can also have its narrow passband swept along with the sweeping of a corresponding laser, as described above.

Figure 21:
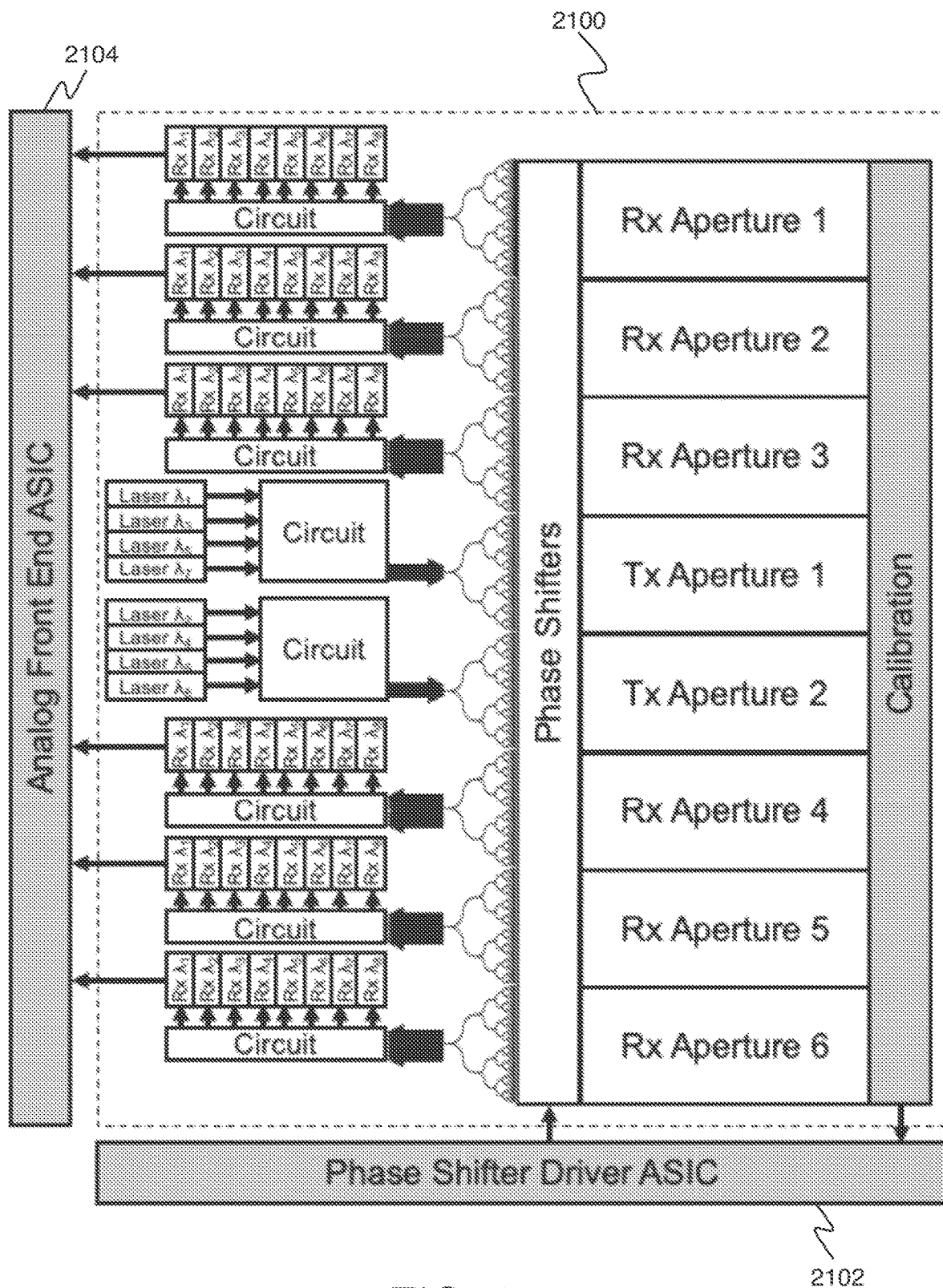
FIG. 21 is a schematic diagram of a portion of a LiDAR system.

In some implementations, multiple apertures can be used for receiving and transmitting different sets of wavelengths, but the receive apertures and transmit apertures can be separate. FIG. 21 shows an example of a portion of a LiDAR system including a WDM system 2100 that includes: transmit (Tx) apertures Tx Aperture 1 and Tx Aperture 2 in the middle of a set of 8 apertures; receive (Rx) apertures Rx Aperture 1, Rx Aperture 2, Rx Aperture 3, Rx Aperture 4, Rx Aperture 5, and Rx Aperture 6 on either side of the transmit apertures; 8 wavelength sources (e.g., multiple lasers, or multiple lines of one laser), and circuitry for connecting to a phase shifter driver application specific integrated circuit (ASIC) 2102, and an analog front-end ASIC 2104 of a LiDAR system. The receive apertures 1-6 are configured with coherent receivers and their electronic output is combined by the analog front-end ASIC 2104. The phase shifter driver ASIC 2102 controls the phase of all phase shifters in both the transmit and receive apertures.

Figure 22:
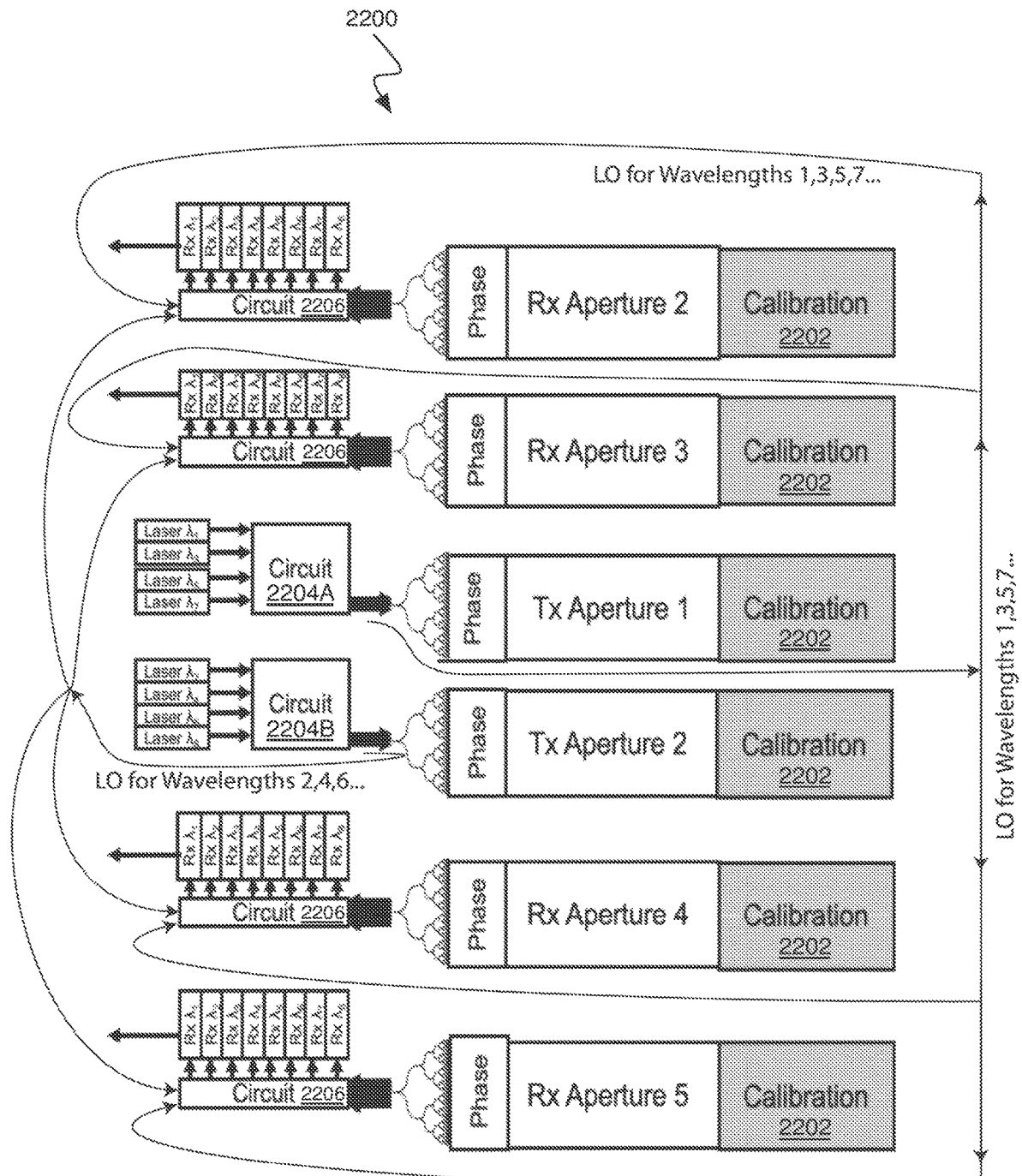
FIG. 22 is a schematic diagram of a portion of the LiDAR system with calibration elements and other photonic circuit elements.
Figure 23:
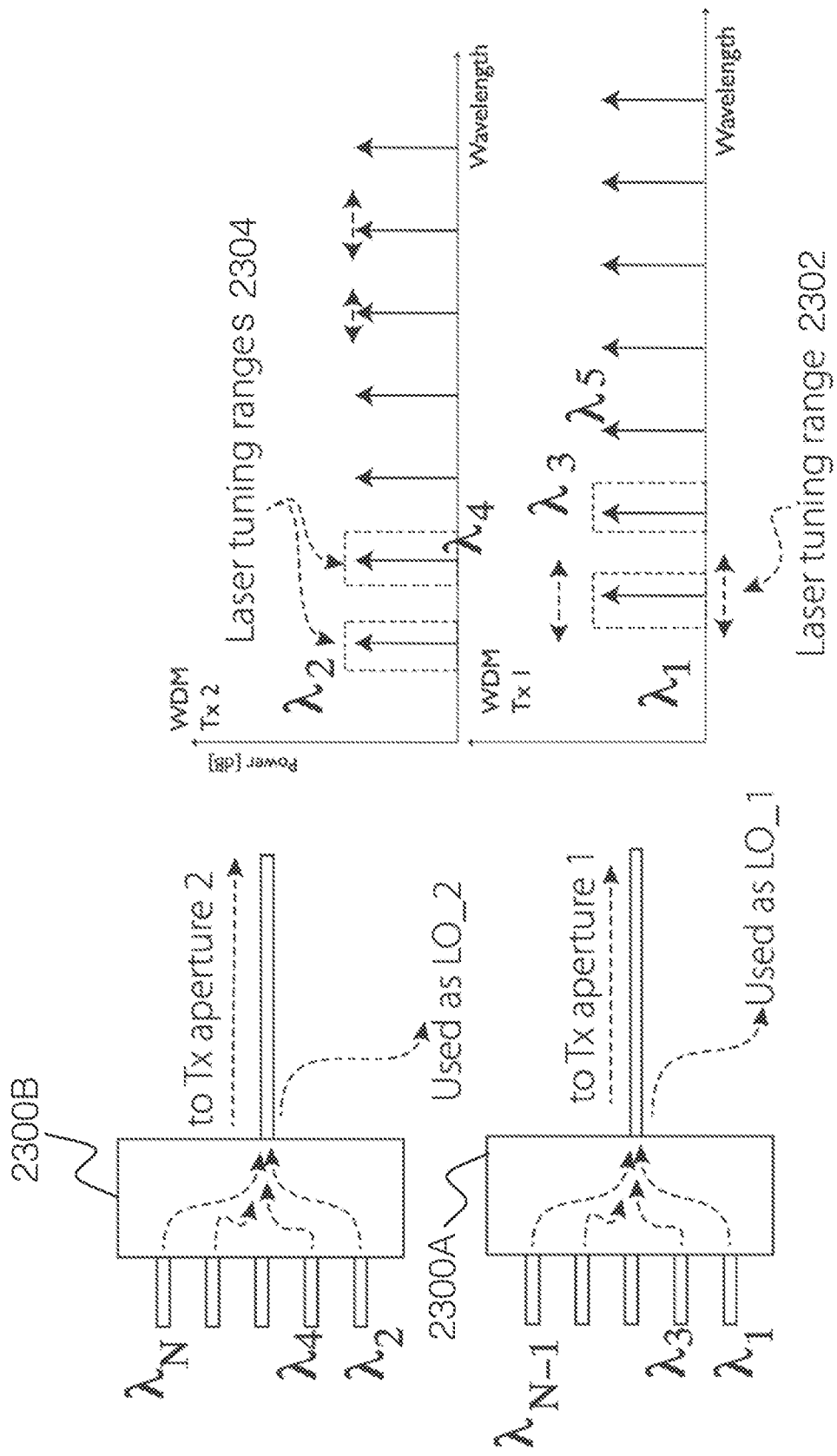
FIG. 23 is a plot of example interleaved wavelength bands for two WDM multiplexers.

FIG. 22 shows a portion 2200 of such a LiDAR system (showing just 4 of the 6 receive apertures) incorporating calibration elements. A set of calibration elements 2202 coupled to the end (or beginning) of each phased array within each aperture ensures that the beam from/to each aperture is diffraction limited and that the apertures are directed to the right directions. Various types of photonic circuit elements, for example elements on a photonics integrated circuit (PIC), can be utilized on the transmit side photonic circuits 2204A and 2204B, and the receive side photonic circuits 2206. The type of WDM filtering/routing performed on the receive side can be different from the WDM filtering/routing performed on the transmit side as the power levels on the receive side are lower than on the transmit side. For example, microring based resonator filters can be used on the receive side (with no significant spectral dead zone), which are not usable on the transmit side because of the power handling limitations of microring based resonator filters. As the receivers can operate with no dead zone, each receive aperture can pick up the signal from all transmit apertures (in this case, 2 transmit apertures). The receive apertures can be coherent and can use a local oscillator (LO) derived from the same light that is being transmitted from the Tx apertures. As can be seen in FIG. 22, a portion of light after the transmitting WDM multiplexing circuits 2204A and 2204B can be collected and fed to the receive WDM filter circuits 2206. One waveguide tap will carry the LOs from the output of the WDM multiplexing circuit 2204B with light from the even-numbered lasers and another waveguide tap will carry the LOs from the output of the WDM multiplexing circuit 2204A with light from the odd-numbered lasers. As shown in FIG. 23, in a generalized example of such WDM multiplexing circuits, an odd-range multiplexer 2300A combines light from odd-numbered lasers, which is sent to Tx aperture 1 and is tapped to provide LO_1, and an even-range multiplexer 2300B combines light from even-numbered lasers, which is sent to Tx aperture 2 and is tapped to provide LO_2. The lasers feeding the Tx arrays are all tunable and are swept across their specific spectral band, so the collection of laser lines on the LO paths will look like combs of laser lines with each of the teeth of the comb independently moving back and forth in its range, where the number of each laser and corresponding spectral band indicates where it occurs in evenly spaced, and offset, sets of spectral bands. For example, FIG. 23 shows the laser tuning range 2302 for the first spectral band occurring between laser tuning ranges 2304 for the second and fourth spectral bands.

Figure 24:
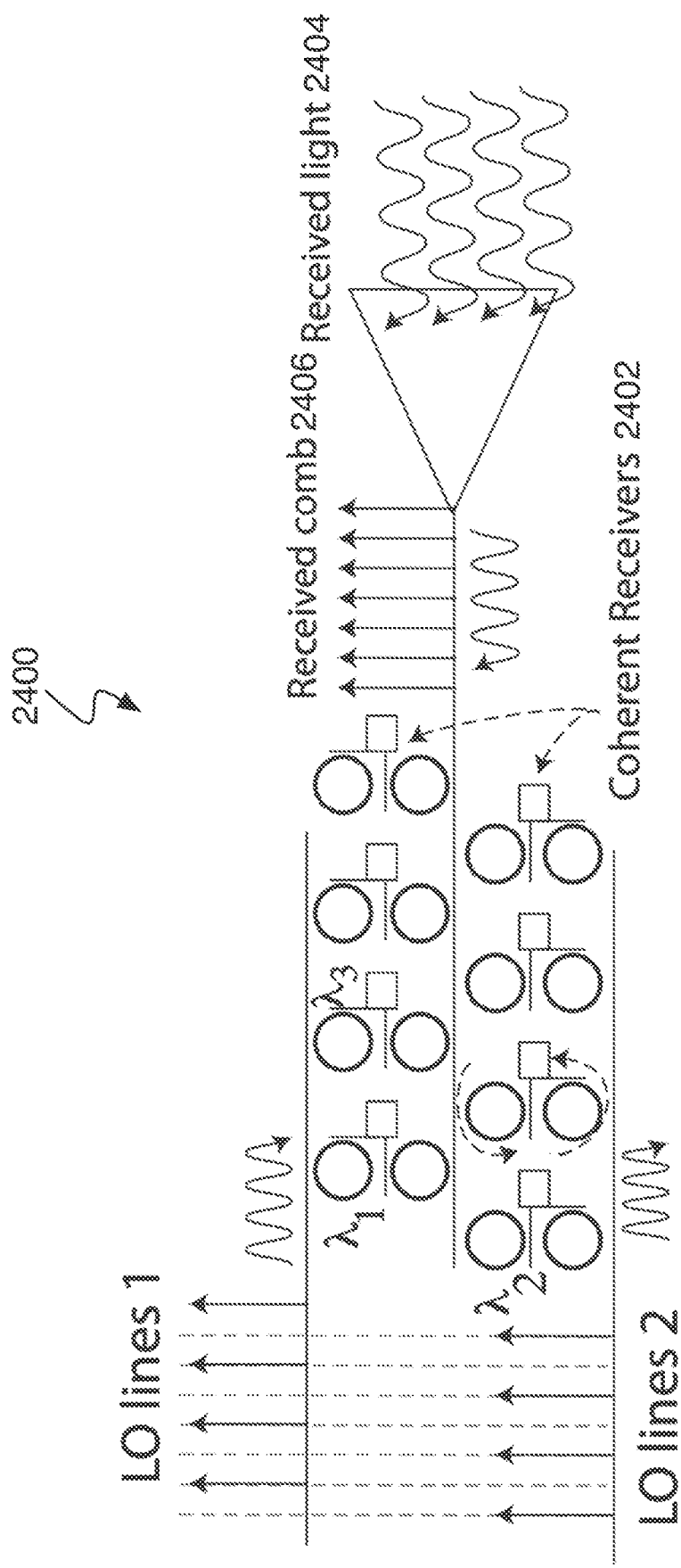
FIG. 24 is a schematic diagram of an example of a WDM optical configuration.

Referring to FIG. 24, a WDM optical configuration 2400 includes coherent receivers 2402 that include microrings that can be continuously/constantly tuned to the instantaneous wavelength of the received light 2404. For example, each microring can be tuned to an individual line of the received comb 2406. There are also LO microrings in the coherent receivers 2402 that can be used to track the wavelength of the corresponding line in the LO lines (within odd-numbered spectral bands) or LO lines 2 (within even-numbered spectral bands).

Figure 25:
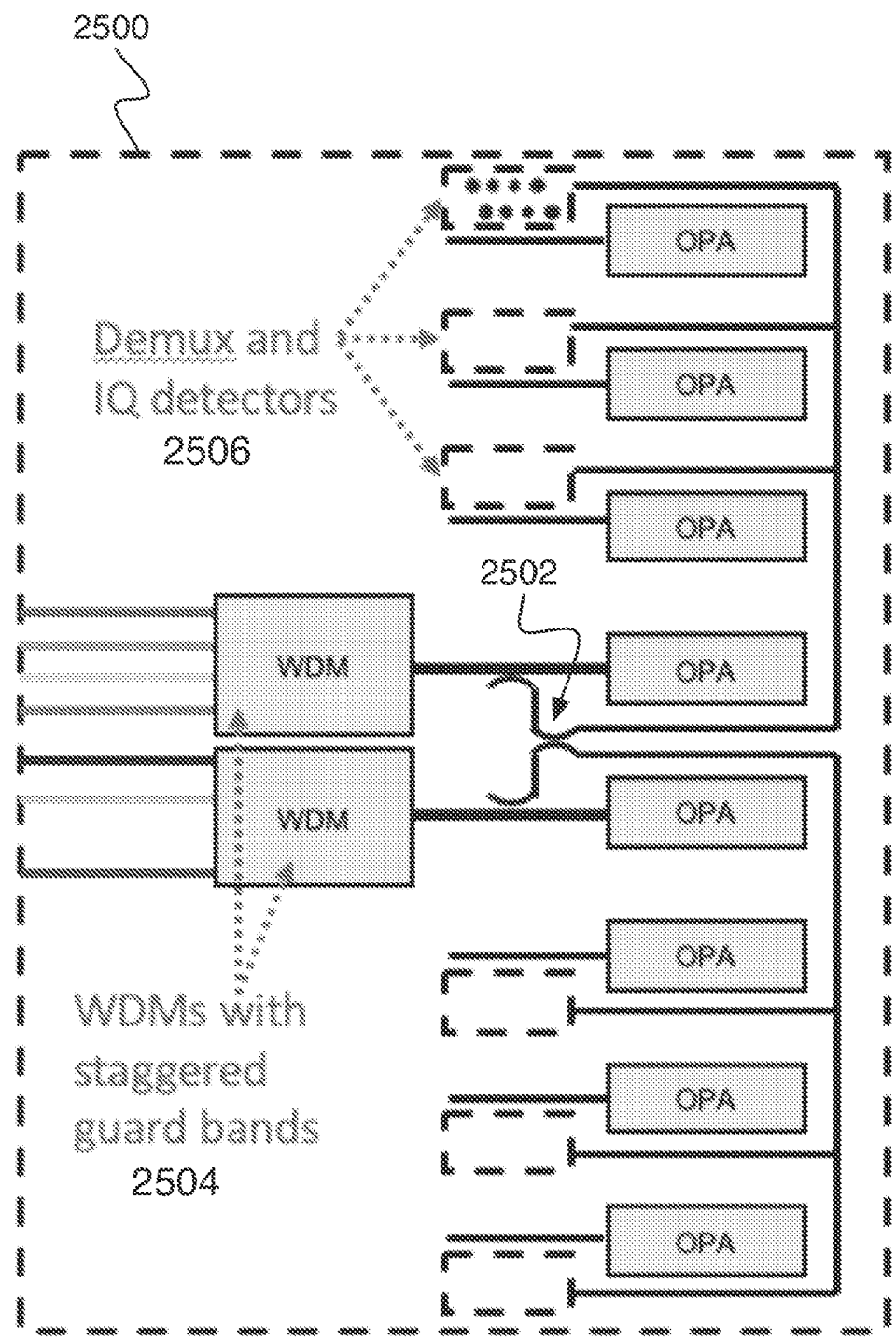
FIG. 25 is a schematic diagram of an optical circuit configuration.

FIG. 25 shows an alternative optical circuit configuration 2500 for delivering the LO lines to the receivers. A 2×2 coupler 2502 can combine the two collections of LO lines tapped after the two WDM multiplexers 2504 with interleaved/staggered guard bands. Each output of the coupler receives half of the light from each tap and the two outputs will contain all laser lines required by the coherent receivers. The LO light is then divided between the receivers in a way that all receivers are provided with all laser lines. The configuration 2500 also includes demultiplexers and in-phase and quadrature (IQ) detectors 2506 that make use of the LO light.

Figure 26:
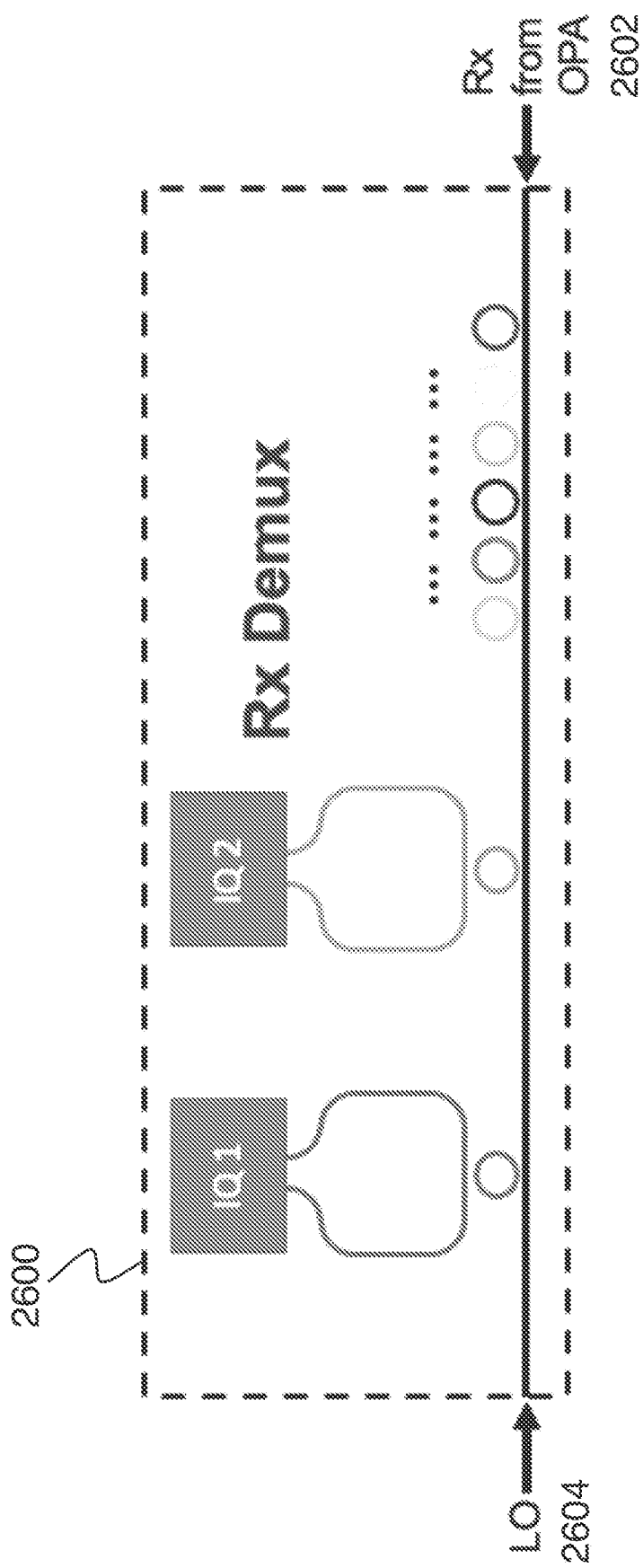
FIG. 26 is a schematic diagram of an optical receiver configuration.

Referring to FIG. 26, an example of an optical receiver configuration 2600 the LO signal 2604 that includes a multiplexed collection of LO lines is fed to the IQ receivers and are mixed with the light 2602 collected from the receiving optical phased arrays (Rx lines) using a microring tuned for that particular IQ receiver. In this example configuration, all IQ receivers are cascaded on the same waveguide using different respective microrings. Each receiving aperture includes such an optical receiver configuration 2600 that contains a series of such filtering receivers (IQ 1, IQ 2, . . . ) covering all wavelengths being received at that aperture. The microring (or other selective filter) is tuned in sync with the tunable lasers in such a way that each microring picks up one LO line and one Rx line. As the received signal is just a delayed and attenuated version of the laser light sent to the environment, the wavelength of the LO line and the corresponding received signal are essentially the same. So, the same filter, given enough bandwidth to accommodate the chirp of the laser, can pick them up simultaneously. As in frequency-modulated continuous-wave (FMCW) systems, the frequency of the laser can be chirped as a function of time, so the instantaneous frequency of the delayed return signal and the emitted light (and LO) are slightly different which leads to beat frequency notes at the receiver. This slight frequency chirp makes it possible that the two laser lines are slightly mismatched in frequency which can be covered by the filter, as mentioned above.

As shown in FIG. 26, when fed from the two sides the LO and the Rx signal will be propagating counter clock-wise (CCW) and clock-wise (CW), respectively, inside each of the microring filters and are dropped to left and right waveguides, respectively, of each IQ detector. The filter can be any other narrow band filter with two outputs, including higher order resonance-based filters, or other forms of filter. The filter can be configured to have a pass band that is narrow enough that it does not interfere with the other WDM lines and is wide enough to pass through the LO and the frequency offset delayed signal.

Figure 27:
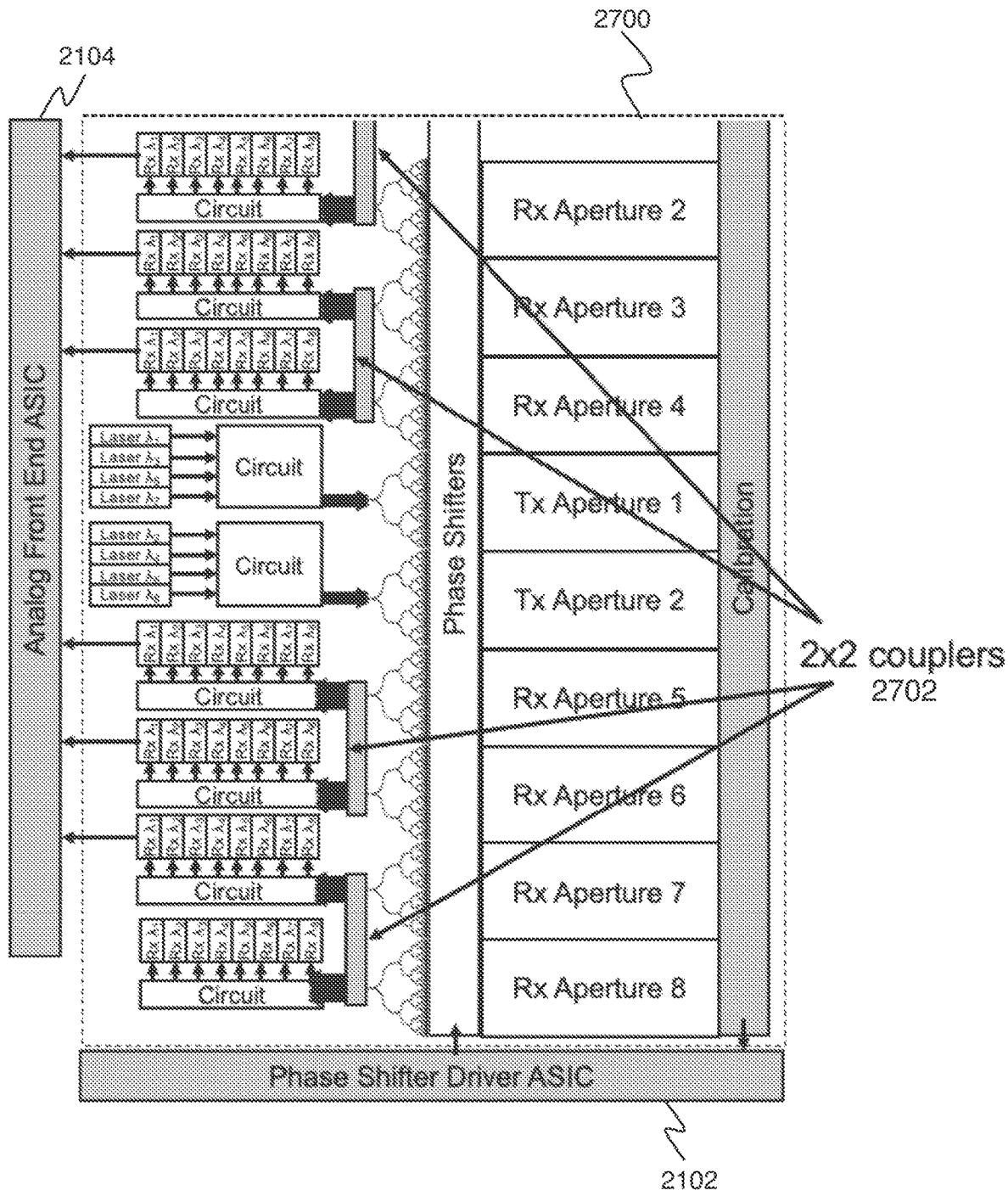
FIG. 27 is a schematic diagram of an example of a portion of a LiDAR system.
Figure 28:
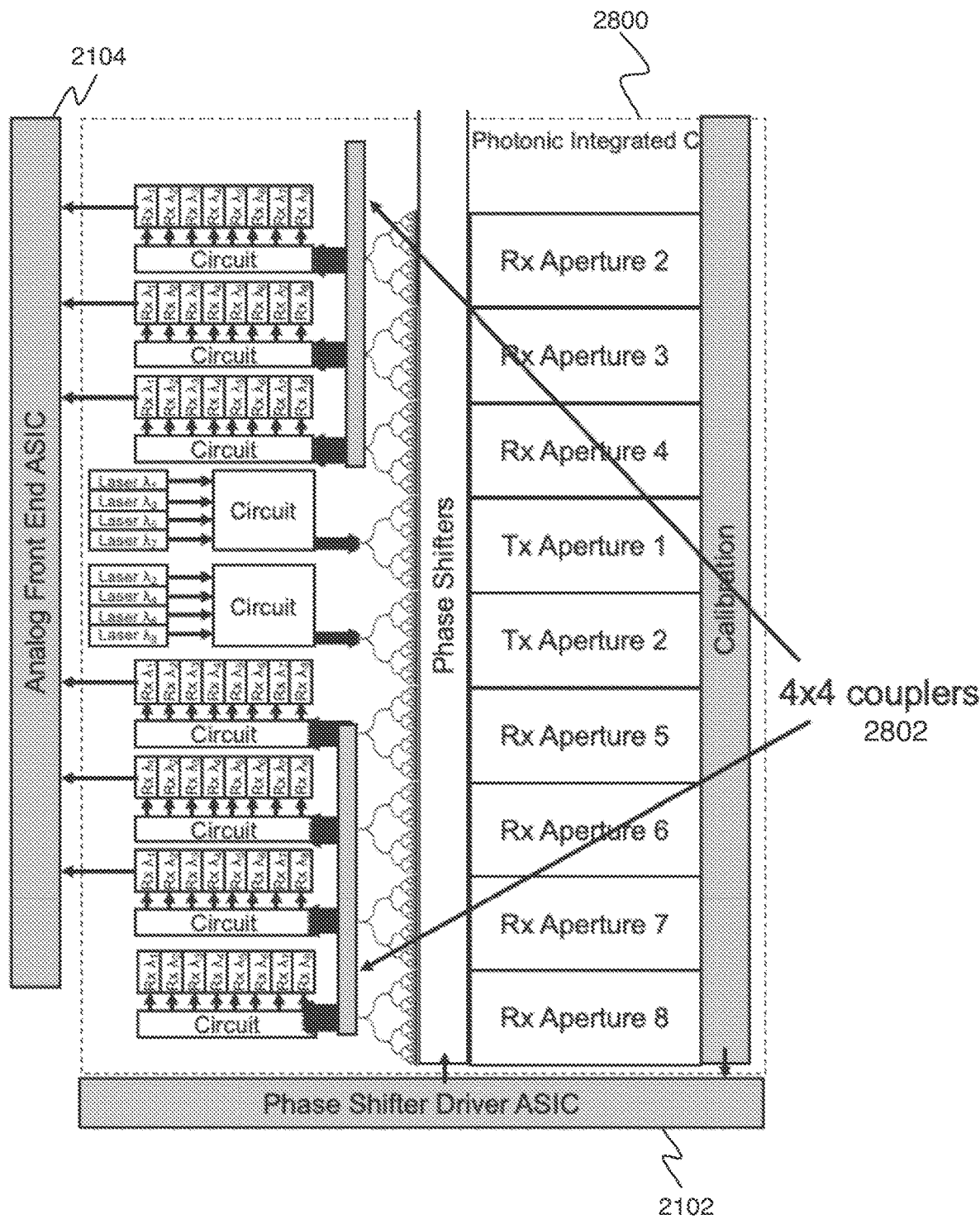
FIG. 28 is a schematic diagram of an example of a portion of a LiDAR system.

FIGS. 27 and 28 show portions of example LiDAR systems that make use of couplers for routing WDM light in different ways. In FIG. 27, the receiving portion of the WDM system 2700 can be configured to include 2×2 couplers 2702 after different pairs of the receive apertures. The WDM light collected by neighboring apertures can be coupled into odd and even output ports for more coherent detection. In other words, for each laser line, if the light collected by apertures 1-2, 3-4, etc. is in phase or out of phase, all of the light for that particular wavelength will be fed to one receiver set and the signal-to-noise ratio for one receiver is increased while the other receiver does not get any light at that wavelength.

Figure 29:
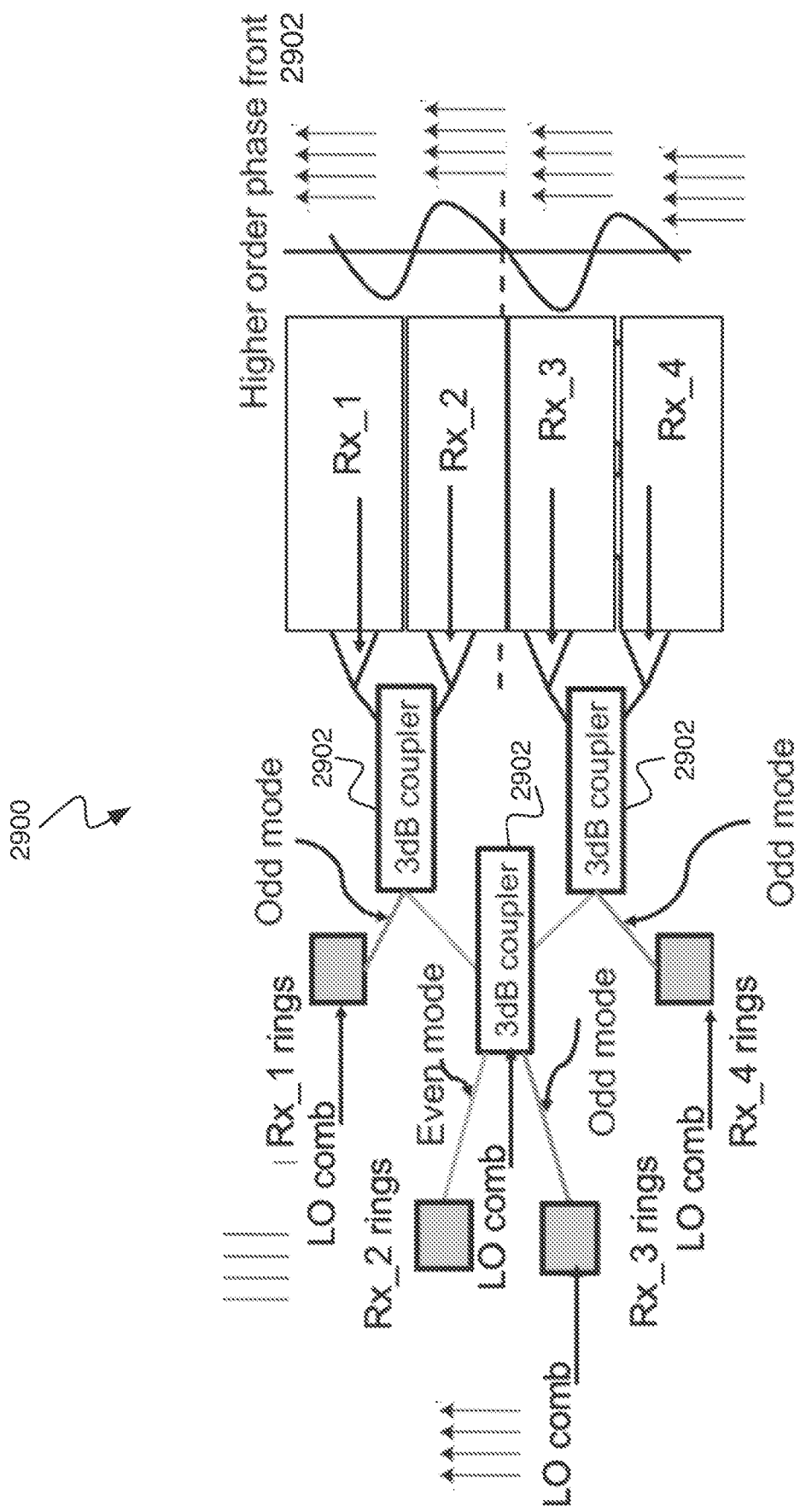
FIG. 29 is a schematic diagram of an example of a portion of a WDM system.

As shown in FIG. 28, this can be further expanded in a receiving portion of the WDM system 2800 that is configured to include 4×4 couplers 2802 after different sets of four receive apertures. Alternatively, referring to FIG. 29, a series of 2×2 splitters, 3 dB couplers 2902, can be placed in the return path to collect more high order spatial modes of the high order phase front 2904 received over a super-aperture comprised of the collection of four adjacent Rx apertures (Rx_1, Rx_2, Rx_3, Rx_4), with even and odd modes provided to different respective Rx rings (Rx_1 rings, Rx_2 rings, Rx_3 rings, Rx_4 rings) combined with LO combs.

Figure 30:
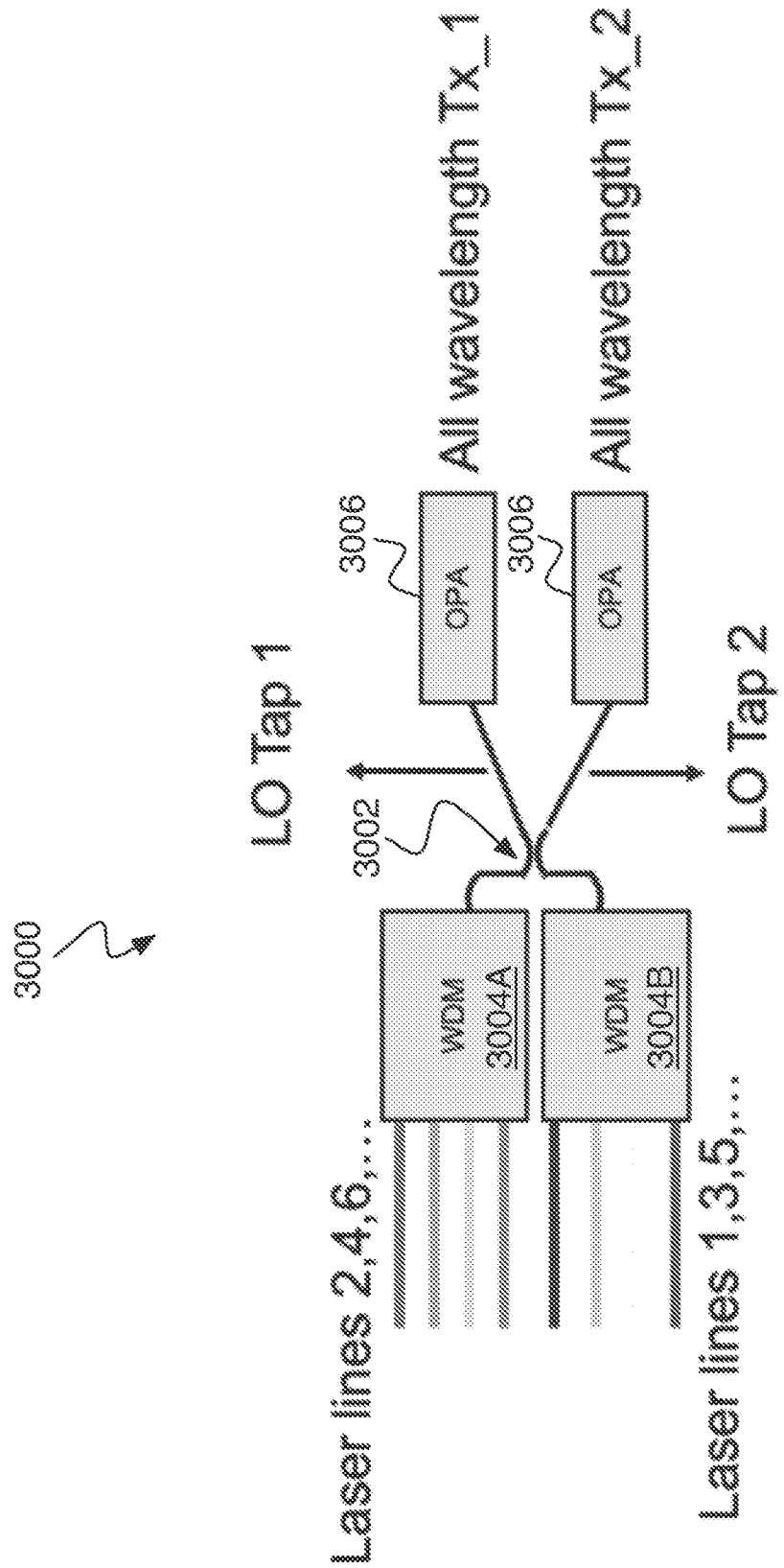
FIG. 30 is a schematic diagram of an example of an optical transmitter configuration.

FIG. 30 shows an example optical transmitter configuration 3000 in which a 2×2 coupler 3002 is placed between two WDM multiplexers 3004A and 3004B for even-numbered and odd-numbered wavelengths, respectively, and two transmitter OPAs 3006 to shine line at all wavelength from both transmitters (Tx_1 and Tx_2).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
    at least one transmitter comprising a send aperture configured to provide at least one beam of a transmitted optical wave along a transmission angle toward a target location, the optical wave comprising at least a first portion of the optical wave, and a second portion of the optical wave having a different characteristic from a characteristic of the first portion of the optical wave; and
    two or more receivers, at least one receiver comprising:
        a receive aperture arranged in proximity to at least one of the send aperture or a receive aperture of a different receiver, the receive aperture being configured to receive at least a portion of a collected optical wave arriving at the receive aperture,
        a filter configured to filter the received portion of the collected optical wave according to the characteristic of the first portion of the optical wave, and
        a detector configured to provide a signal based on the filtered portion of the collected optical wave.

2. The apparatus of claim 1, wherein each detector comprises a coherent detector configured to optically combine the received portion of the collected optical wave with a local oscillator optical wave to provide a combined optical wave and to detect the combined optical wave to provide the signal.

3. The apparatus of claim 2, wherein there is a frequency shift between the local oscillator and the transmitted optical wave to enable heterodyne detection in coherent detectors.

4. The apparatus of claim 2, wherein each signal comprises an amplitude and a phase angle, and the respective component corresponding to that signal comprises a quantity that is based on the amplitude and is independent from the phase angle.

5. The apparatus of claim 4, wherein the circuitry is configured to convert each signal to digital form and to process the signals in digital form to remove dependence on the phase angles.

6. The apparatus of claim 4, wherein at least one coherent detector is configured to use a first local oscillator optical wave to provide an in-phase combined optical wave and to use a second local oscillator optical wave shifted relative to the first local oscillator wave to provide a quadrature combined optical wave, and to provide the amplitude and phase angle in an In-phase/Quadrature (I/Q) space.

7. The apparatus of claim 4, wherein the circuitry is configured to perform a transform on a real-valued signal provided from one of the detectors to provide the amplitude and phase angle in a complex space of a resulting complex transform of the real-valued signal.

8. The apparatus of claim 2, wherein each detector is configured to generate a current that represents a difference between photocurrents generated by a pair of balanced photodetectors.

9. The apparatus of claim 1, wherein a total quantity of the receive apertures is between 3 and 20.

10. The apparatus of claim 9, wherein a total quantity of the receive apertures is between 4 and 10.

11. The apparatus of claim 9, wherein a total quantity of send apertures is 1.

12. The apparatus of claim 1, wherein an area of each receive apertures is equal to an area of the send aperture within a factor of between 4/9 to 9/4.

13. The apparatus of claim 1, wherein the transmitter comprises an optical phased array within the send aperture.

14. The apparatus of claim 13, wherein at least one optical phased array within the send aperture or at least one of the receive apertures is configured to steer a first angle using phases of elements of the optical phased array and to steer a second angle using wavelength.

15. The apparatus of claim 1, wherein the receiver is a first receiver, the receive aperture is a first receive aperture, the filter is a first filter, the detector is a first detector, and the two or more receivers include a second receiver comprising:
    the send aperture configured as a second receive aperture configured to receive at least a portion of a collected optical wave arriving at the second receive aperture,
    a second filter configured to filter the received portion of the collected optical wave according to a characteristic different from the characteristic of the first portion of the optical wave and different from the characteristic of the second portion of the optical wave, and
    a second detector configured to provide a signal based on the filtered portion of the collected optical wave filtered by the second filter.

16. The apparatus of claim 1, further comprising circuitry configured to determine an estimated distance associated with the collected optical wave based at least in part on a combination that includes a respective component corresponding to each of two or more of the signals provided from the detectors of the two or more receivers.

17. The apparatus of claim 16, wherein the transmitter applies linear frequency modulation to the transmitted optical wave to enable the circuitry to determine the estimated distance.

18. The apparatus of claim 1, wherein the send aperture is further configured as a receive aperture in which an optical phased array is used to receive at least a portion of an optical wave having a different characteristic from a characteristic of the transmitted optical wave, and at least one of the receive apertures is used as a send aperture for providing a beam of an optical wave having the different characteristic.

19. The apparatus of claim 1, wherein the characteristics comprise at least one of:
a particular wavelength, a particular time slot, or a particular polarization.

20. The apparatus of claim 19, wherein the characteristics comprise a particular wavelength.

21. The apparatus of claim 20, wherein one or more optical sources provide a plurality of spectral components tunable over different respective spectral bands, and the first portion of the optical wave comprises a first spectral component and the second portion of the optical wave comprises a second spectral component different from the first spectral component.

22. The apparatus of claim 21, further comprising the one or more optical sources.

23. The apparatus of claim 21, wherein the send aperture is further configured as a receive aperture in which an optical phased array is used to receive a third spectral component different from the first spectral component and different from the second spectral component.

24. The apparatus of claim 23, wherein the third spectral component has a wavelength between a wavelength of the first spectral component and a wavelength of the second spectral component, and the transmitted optical wave does not have significant power at the wavelength of the third spectral component.

25. The apparatus of claim 21, wherein the send aperture is a first send aperture and the transmitted optical wave is a first transmitted optical wave, and the apparatus comprises a second send aperture configured to provide at least one beam of a second transmitted optical wave comprising at least a third spectral component different from the first spectral component and different from the second spectral component.

26. The apparatus of claim 25, wherein the second send aperture is further configured as a second receive aperture in which an optical phased array is used to receive the first spectral component.

27. The apparatus of claim 26, further comprising a coherent receiver configured to detect the first spectral component received from the second receive aperture by coherent mixing with a local oscillator derived from at least one optical source that provides the first spectral component to the first send aperture.

28. The apparatus of claim 25, wherein the third spectral component has a wavelength between a wavelength of the first spectral component and a wavelength of the second spectral component, and the first transmitted optical wave does not have significant power at the wavelength of the third spectral component.

29. The apparatus of claim 28, wherein the first send aperture and the second send aperture are located in proximity to a center of an arrangement of apertures, and at least some of the receive apertures are located in proximity to edges of the arrangement of apertures.

30. The apparatus of claim 28, wherein a quantity of receive apertures is greater than a quantity of send apertures in the arrangement of apertures.

31. A method, comprising:
providing at least one beam of a transmitted optical wave along a transmission angle toward a target location from a send aperture of a transmitter, the optical wave comprising at least a first portion of the optical wave, and a second portion of the optical wave having a different characteristic from a characteristic of the first portion of the optical wave; and
receiving a collected optical wave at receive apertures of two or more receivers, at least one receiver comprising:
a receive aperture arranged in proximity to at least one of the send aperture or a receive aperture of a different receiver, the receive aperture being configured to receive at least a portion of a collected optical wave arriving at the receive aperture,
a filter configured to filter the received portion of the collected optical wave according to the characteristic of the first portion of the optical wave, and
a detector configured to provide a signal based on the received filtered portion of the collected optical wave.

32. A LiDAR system, comprising:
an arrangement of two or more apertures configured to provide, from at least two of the two or more apertures, at least one beam of a transmitted optical wave toward a target location; and
a transmitter subsystem configured to:
provide to a first subset consisting of fewer than all of the two or more apertures a first portion of the transmitted optical wave, and
provide to a second subset consisting of fewer than all of the two or more apertures a second portion of the transmitted optical wave, the second subset being different from the first subset, and the second portion of the optical wave having a different characteristic from a characteristic of the first portion of the optical wave; and
a receiver subsystem comprising:
a first filter configured to filter a portion of a collected optical wave arriving at at least one of the two or more apertures in the arrangement, according to the characteristic of the second portion of the optical wave, and
a first detector configured to provide a signal based on the portion of the collected optical wave filtered by the first filter.

33. The LiDAR system of claim 32, wherein the characteristics comprise a particular wavelength, and the first portion of the transmitted optical wave comprises light having a wavelength in a first spectral band and the second portion of the transmitted optical wave comprises light having a wavelength in a second spectral band different from the first spectral band.

34. The LiDAR system of claim 33, wherein the first filter is configured to filter a portion of the collected optical wave arriving at a first aperture of the two or more apertures, and the receiver subsystem further comprises:
a second filter configured to filter a portion of the collected optical wave arriving at a second aperture of the two or more apertures, according to the characteristic of the first portion of the optical wave, and
a second detector configured to provide a signal based on the portion of the collected optical wave filtered by the second filter.

35. The LiDAR system of claim 34, wherein the transmitter subsystem includes a wavelength division multiplexing component configured to combine the light having a wavelength in the first spectral band with light having a wavelength in a third spectral band, where the second spectral band is between the first spectral band and the third spectral band.

36. The LiDAR system of claim 33, wherein the arrangement of two or more apertures includes a third aperture, and the first filter is configured to filter a portion of the collected optical wave arriving at the third aperture.

37. The LiDAR system of claim 36, wherein the transmitter subsystem includes
- a first wavelength division multiplexing component configured to combine the light having a wavelength in a first spectral band with light having a wavelength in a third spectral band, and
- a second wavelength division multiplexing component configured to combine the light having a wavelength in the second spectral band with light having a wavelength in a fourth spectral band,
- wherein the second spectral band is between the first spectral band and the third spectral band, and the third spectral band is between the second spectral band and the fourth spectral band.

38. The LiDAR system of claim 33, wherein the first filter comprises a tunable filter having a passband that is tunable over the second spectral band, and the receiver subsystem is configured to tune the first filter based at least in part on the light having the wavelength in the second spectral band.

* * * * *